(12) United States Patent
Suzuki

(10) Patent No.: US 7,635,602 B2
(45) Date of Patent: Dec. 22, 2009

(54) SIMULATOR OF ION IMPLANTATION AND METHOD FOR MANUFACTURING SEMICONDUCTOR DEVICE

(75) Inventor: Kunihiro Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/013,605

(22) Filed: Jan. 14, 2008

(65) Prior Publication Data
US 2008/0166824 A1    Jul. 10, 2008

Related U.S. Application Data

(63) Continuation of application No. PCT/JP2005/012922, filed on Jul. 13, 2005.

(51) Int. Cl.
G01R 31/26 (2006.01)
(52) U.S. Cl. ............... 438/17; 324/71.5; 324/500; 324/719
(58) Field of Classification Search .............. None
See application file for complete search history.

(56) References Cited

U.S. PATENT DOCUMENTS

| | | | | |
|---|---|---|---|---|
| 5,670,391 | A | * | 9/1997 | Lim et al. ............... 438/530 |
| 5,999,719 | A | * | 12/1999 | Asada et al. ............. 703/12 |
| 6,128,084 | A | | 10/2000 | Nanbu et al. |
| 6,154,718 | A | * | 11/2000 | Sakamoto ............... 703/12 |
| 6,212,487 | B1 | | 4/2001 | Sakamoto |

FOREIGN PATENT DOCUMENTS

| | | |
|---|---|---|
| JP | 10256172 A | 9/1998 |
| JP | 2000138178 A | 5/2000 |
| JP | 2001230291 A | 8/2001 |

OTHER PUBLICATIONS

Vuong et al. (IEEE Trans. Electron Devices, vol. 47, No. 7, Jul. 2000, pp. 1401-1405).*
Hobler et al. (IEEE Trans. Computer-Aided Design, vol. 8, No. 5, May 1989, pp. 450-459).*
Stippel et al. (Workshop on Numerical Modeling of Processes and Devices for Integrated Circuits, NUPAD IV (Cat. No. 92TH0424-2), 1992, p. 231-6, 6 refs, pp. 255, ISBN: 0-7803-0516-7. Publisher: IEEE, New York, NY, USA).*
Hobler et al. (International Electron Devices Meeting 1997. IEDM Technical Digest (Cat. No. 97CH36103), 1997, p. 489-92, 22 refs, pp. 944, ISBN: 0-7803-4100-7. Publisher: IEEE, New York, NY, USA).*
Hobler et al. (NASECODE V. Proceedings of the Fifth International Conference on the Numerical Analysis of Semicondutor Devices and Integrated Circuits (IEEE Cat. No. 87CH2502-3), 1987, p. 225-30, 4 refs, pp. xi+354, ISBN: 0-906783-72-0. Publisher: Boole Press, Dun Laoghaire, Ireland).*

(Continued)

*Primary Examiner*—Ha Tran T Nguyen
*Assistant Examiner*—Shantanu C Pathak
(74) *Attorney, Agent, or Firm*—Fujitsu Patent Center

(57) ABSTRACT

There is provided a method for simulating ion implantation which includes the steps of calculating an integral value $\Phi_{a/c}$ by integrating concentration distribution of Ge in a test silicon substrate from the thickness of an amorphous layer to infinite, acquiring a form parameter of the Ge concentration distribution in a product silicon substrate by referring to a database, creating a distribution function which approximates the Ge concentration distribution by using the form parameter, and obtaining such a depth that an integral value obtained by integrating the distribution function from the depth to infinite can be equal to the integral value $\Phi_{a/c}$, and then specifying that the depth is the thickness of an amorphous layer.

17 Claims, 31 Drawing Sheets

OTHER PUBLICATIONS

H. Cerva et al; "Comparison of Transmission Electron Microscope Cross Sections of Amorphous Regions in Ion Implanted Silicon with Point-Defect Density Calculation"; J. Electrochem. Soc., vol. 139, No. 12, pp. 3631-3638.

M. Posselt and B. Schmidt et al; "Modeling of Damage Accumulation during Ion Implantation into Single-Crystalline Silicon"; J. Electrochem, Society, vol. 144, No. 4, Apr. 1997, pp. 1495-1504.

Gerhard Hobler & Siegfried Selberherr et al; "Two-Dimensional Modeling of Ion Implantation Inducted Point Defects"; IEEE Trans. Computer-Aided Design, vol. 7, No. 2, Feb. 1988, pp. 174-180.

Kunihiro Suzuki et al; "Comprehensive Analytical Expression for Dose Dependent Ion-Implanted Impurity Concentration Profiles"; Solid-State Electronics, vol. 42, No. 9, pp. 1671-1678.

International Search Report of PCT/JP2005/012922, date of mailing Oct. 25, 2005.

\* cited by examiner

FIG. 12

| implanting energy E | R$_p$($\mu$m) | $\Delta$R$_p$($\mu$m) | $\gamma$ | $\beta$ |
|---|---|---|---|---|
| 5.0000 | 7.0000 | 3.4000 | 0.47000 | 3.5000 |
| 10.000 | 11.400 | 6.2000 | 0.47000 | 3.5000 |
| 20.000 | 19.500 | 8.5000 | 0.47000 | 3.5000 |
| 40.000 | 33.400 | 14.100 | 0.47000 | 3.5000 |
| 80.000 | 60.700 | 23.500 | 0.47000 | 3.5000 |
| 160.00 | 110.20 | 40.900 | 0.47000 | 3.5000 |

105

SIMULATOR OF ION IMPLANTATION AND METHOD FOR MANUFACTURING SEMICONDUCTOR DEVICE

CROSS-REFERENCE TO RELATED APPLICATIONS

This application is a continuation of prior International Patent Application No. PCT/JP2005/012922, filed Jul. 13, 2005, the entire contents of which are incorporated herein by reference.

TECHNICAL FIELD

It is related to a simulating method of ion implantation and method for manufacturing a semiconductor device.

BACKGROUND

Semiconductor devices, such as an LSI, have been reduced in size, and it has become increasingly important to control distribution of an impurity introduced into a silicon substrate with high precision. For example, as for a source/drain extension of a MOS transistor, it has been conventionally performed that an impurity is ion-implanted into a silicon substrate, and the impurity thus implanted is then activated by means of activation annealing. However, since the impurity is diffused at the time of the activation annealing in this method, it is difficult to accurately control the impurity distribution.

It is known in the art that this problem can be avoided by employing such a method in which a surface layer of the silicon substrate is damaged to form an amorphous layer by ion-implanting germanium into the silicon substrate. After that, an impurity for a source/drain extension is ion-implanted into the silicon substrate so that the impurity is encompassed in this amorphous layer. According to this method, the temperature for activation annealing can be set lower compared to the case where an amorphous layer is not formed. Thus, the diffusion of the impurity due to heat can be prevented, and the impurity concentration can be easily controlled. Note that the amorphous layer is crystallized again at the time of crystallization annealing.

In the case of employing such a method, an ion implantation condition has to be determined so that a major part of an impurity for the source/drain extension would be encompassed in the range of the thickness of the amorphous layer. Hence, it is needed to obtain the thickness of the amorphous layer.

Moreover, even in the case where the germanium ion-implantation is omitted, the amorphous layer is also formed by ion-implanting the impurity for the source/drain extension. Many defects are formed in the interface between this amorphous layer and the silicon substrate which is not crystallized (that is, the bottom surface of the amorphous layer). Since the positions of the defects greatly affect characteristics of the device, it is important to obtain the thickness of the amorphous layer even in this case.

As a method for obtaining the thickness of the amorphous layer, there is a method of measuring the thickness of the amorphous layer from an image obtained by observing, with TEM (Transmission Electron Microscopy), a cross section of a sample after ion implantation, for example.

However, an ion implantation is performed many times in a semiconductor device under various implantation conditions. Thus, if observation using a TEM is performed for each ion implantation, the cost increases and a considerable amount of labor is required.

In M. Posselts, B. Schmidt, R. Groetzschel, C. S. Murthy, T. Feudel, and K. Suzuki, "Modeling of damage accumulation during ion implantation into single-crystalline silicon," J. Electrochem. Society, vol. 144, pp. 1495-1504, 1997, a fitting parameter is provided so as to accord with experimental data in the Monte Carlo method, and thereby the thickness of an amorphous layer is quantitatively calculated. However, it is difficult to model the damage accumulation caused by ion implantation. Furthermore, a long period of time is required for calculation by the Monde Carlo method. Therefore, an ordinary device designer cannot easily use this method.

Japanese Patent Application Laid-open Publication No. 2001-230291 discloses a method of measuring the thickness of the above-mentioned amorphous layer by means of a spectroscopic ellipsometry.

Japanese Patent Application Laid-open Publication No. 2000-138178 discloses a method of calculating the lateral extension of an ion-implanted impurity.

G. Hobler, S. Selberherr, "Two-dimensional modeling of ion implantation induced point defects," IEEE Trans. Compute-Aided Design, vol. 7, pp. 174-180, 1988 proposes an empirical model for generating defect concentration distribution from a result calculated by the Monte Carlo method.

Furthermore, the Kunihiro Suzuki, Ritsuo Sudo, Yoko Tada, Miki Tomotani, Thomas Feudel, and W. Fichtner, "Comprehensive analytical expression for dose dependent ion-implanted impurity concentration profiles," Solid-State Electronic, vol. 42, pp. 1671-1678, 1998 shows that a vast amount of database of concentration distribution by ion implantation is present.

SUMMARY

It is an aspect of the embodiments discussed herein to provide a simulating method of ion implantation including, calculating an integral value $\Phi_{a/c}$ by integrating an impurity concentration distribution from a thickness $d_0$ of an amorphous layer to infinite, where the impurity being ion-implanted into a test crystalline substrate under a test condition, and the amorphous layer is formed in the test crystalline substrate by the ion-implantation, acquiring a form parameter of an impurity concentration distribution in a product crystalline substrate that is to be obtained by ion-implanting the impurity under a product condition, by referring to a database in which the form parameter of the impurity concentration distribution is stored so as to correspond to a condition of ion implantation, creating a distribution function that approximates the impurity concentration distribution by using the acquired form parameter, and obtaining such a depth $d_a$ that an integral value obtained by integrating the distribution function from the depth $d_a$ to infinite is equal to the integral value $\Phi_{a/c}$, and specifying that a thickness of the amorphous layer to be formed in the product crystalline substrate by ion-implanting the impurity under the product condition is the depth $d_a$.

It is another aspect of the embodiments discussed herein to provide a method for manufacturing a semiconductor device including, forming a gate electrode over a semiconductor substrate with a gate insulating film therebetween, forming an amorphous layer in a surface layer of the semiconductor substrate by ion-implanting a first impurity into the semiconductor substrate on both sides of the gate electrode under a first condition, forming an impurity diffusion region by ion-implanting a second impurity into the semiconductor substrate on both sides of the gate electrode under a second condition that a peak depth of the impurity is within the thickness of the amorphous layer, and activating the second impurity by heating the semiconductor substrate, wherein, ion-implanting the first impurity further including calculating an integral value $\Phi_{a/c}$ by integrating a concentration distribution of the first impurity from a thickness $d_0$ of an amorphous layer to infinite, where the amorphous layer being formed in a test crystalline substrate by ion-implanting the first impurity into the test crystalline substrate under a test condition, acquiring a form parameter of a concentration distribution of the first impurity that is to be obtained by the first condition, by referring to a database in which the form parameter of the concentration distribution of the first impurity is stored so as to correspond to a condition of ion implantation, creating a distribution function that approximates the concentration distribution of the first impurity by using the acquired form parameter, and obtaining such a depth $d_a$ that an integral value obtained by integrating the distribution function from the depth $d_a$ to infinite is equal to the integral value $\Phi_{a/c}$, and specifying that a thickness of the amorphous layer formed in the semiconductor substrate is the depth $d_a$.

It is still another aspect of the embodiments discussed herein to provide a method for manufacturing a semiconductor device including, forming a gate electrode over a semiconductor substrate with a gate insulating film interposed therebetween, forming an impurity diffusion region by ion-implanting an impurity into the semiconductor substrate on both sides of the gate electrode, and activating the impurity by heating the semiconductor substrate, wherein, ion-implanting the impurity further including calculating an integral value $\Phi_{a/c}$ by integrating a concentration distribution of the impurity from a thickness $d_0$ of an amorphous layer to infinite, where the amorphous layer being formed in a test crystalline substrate by ion-implanting the impurity into the test crystalline substrate under a test condition, acquiring a form parameter of an impurity concentration distribution that is to be obtained by a condition of the ion-implantation of forming the impurity diffusion region, by referring to a database in which the form parameter of the impurity concentration distribution is stored so as to correspond to a condition of ion implantation, creating a distribution function that approximates the impurity concentration distribution by using the acquired form parameter, and obtaining such a depth $d_a$ that an integral value obtained by integrating the distribution function from the depth $d_a$ to infinite is equal to the integral value $\Phi_{a/c}$, and specifying that a thickness of an amorphous layer formed in the semiconductor substrate at the time of forming the impurity diffusion region is the depth $d_a$.

BRIEF DESCRIPTION OF THE DRAWINGS

FIG. 12 is a schematic view of an ion implantation database;

DETAILED DESCRIPTION OF THE EMBODIMENTS (1) First Embodiment (i) Effects of Ge Ion Implantation Firstly, effects obtained by ion-implanting Ge (germanium) into a silicon substrate will be described.

Figure 1A:
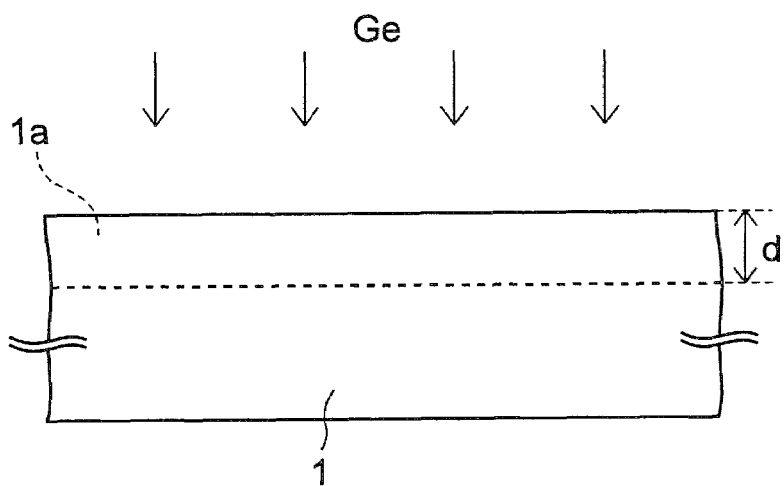
FIGS. 1A to 1C are cross-sectional views of a sample prepared for investigating the effects of Ge ion implantation.
Figure 1B:
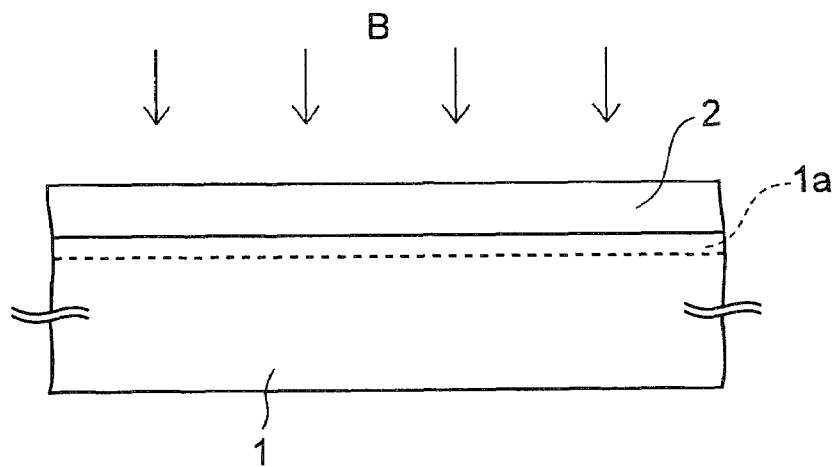
Figure 1C:
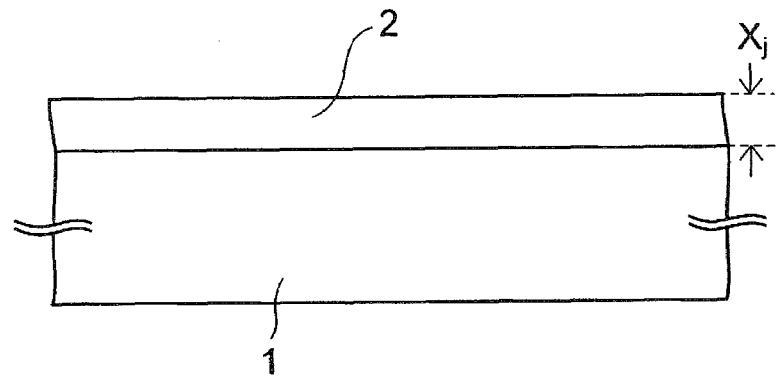

FIGS. 1A to 1C are cross-sectional views of a sample prepared to confirm the effects of the Ge ion implanting.

To prepare the sample, as shown in FIG. 1(a), firstly, Ge was ion-implanted into a silicon substrate 1 of a (100) plane direction to cause damage on a surface layer of the silicon substrate 1. Thus, the surface layer was amorphousized and made into an amorphous layer 1a. As a condition of the Ge ion implantation, the implanting energy of 40 keV and a dose amount of $2 \times 10^{14}$ cm$^{-2}$ were employed. In addition, in this ion implantation, a tilt angle was set to 7° and a rotation angle was set to 0°.

Next, as shown in FIG. 1B, an impurity diffusion region 2 was formed in the amorphous layer 1a by employing such a condition that B (boron) was encompassed in the amorphous layer 1a, for example, a condition that the implanting energy of 1 keV and the dose amount of $1 \times 10^{15}$ cm$^{-2}$.

After that, as shown in FIG. 1C, activation annealing was performed on the silicon substrate 1 so as to activate the B in the impurity diffusion region 2, and to crystallize the amorphous layer 1a.

Figure 2:
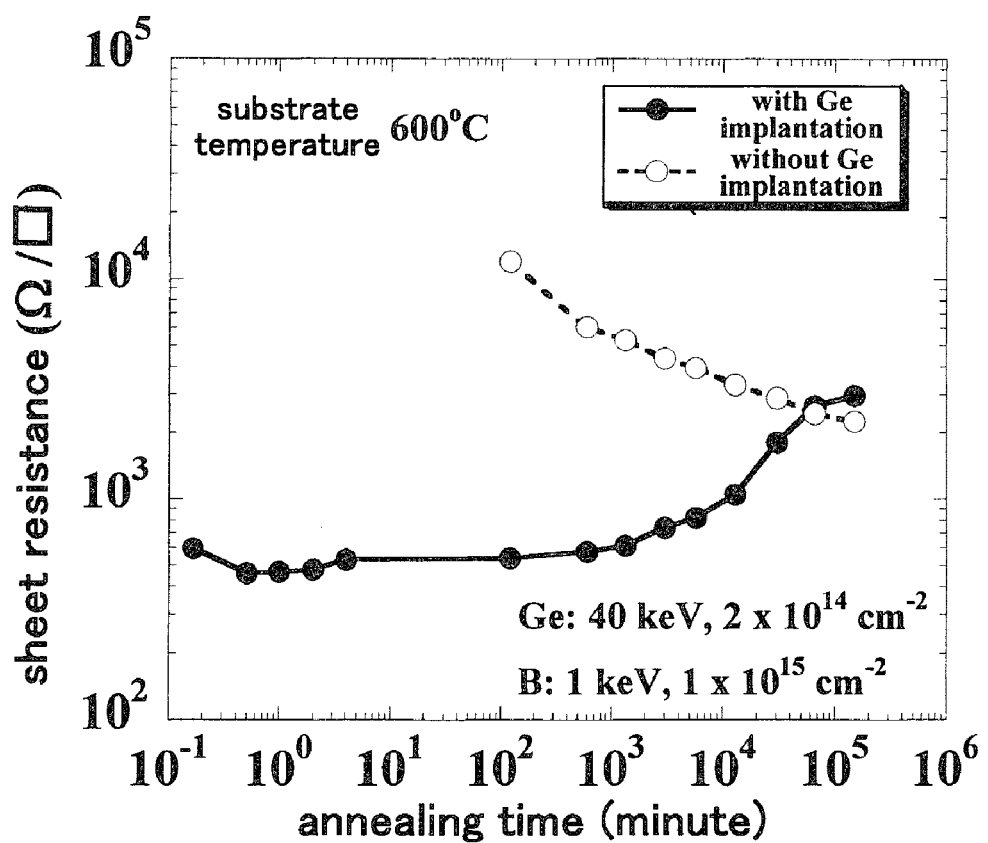
FIG. 2 is a graph obtained by investigating a relationship between an annealing time and the sheet resistance of an impurity diffusion region in the activation annealing shown in FIG. 1C.

FIG. 2 is a graph obtained by investigating the relationship between an annealing time of activation annealing of FIG. 1C and a sheet resistance of the impurity diffusion region 2. Note that the substrate temperature of the activation annealing was set at 600° in this investigation. In addition, comparative results are also shown in FIG. 1C, which are obtained in the case where the Ge ion-implanting was omitting, and only B ion-implanting was carried out.

As shown in FIG. 2, it can be seen that the sheet resistance of the impurity diffusion region 2 can be sufficiently reduced even by the activation annealing with the relatively low substrate temperature of 600° when Ge was ion-planted. In contrast, it can be seen that when Ge is not ion-implanted, the sheet resistance becomes higher than that of the case where Ge is ion-implanted, in a processing time shorter than $10^5$ seconds. Thus, where the Ge ion-implanting is omitted, the impurity diffusion region 2 cannot be sufficiently activated by the activation annealing with the substrate temperature of 600°.

Figure 3:
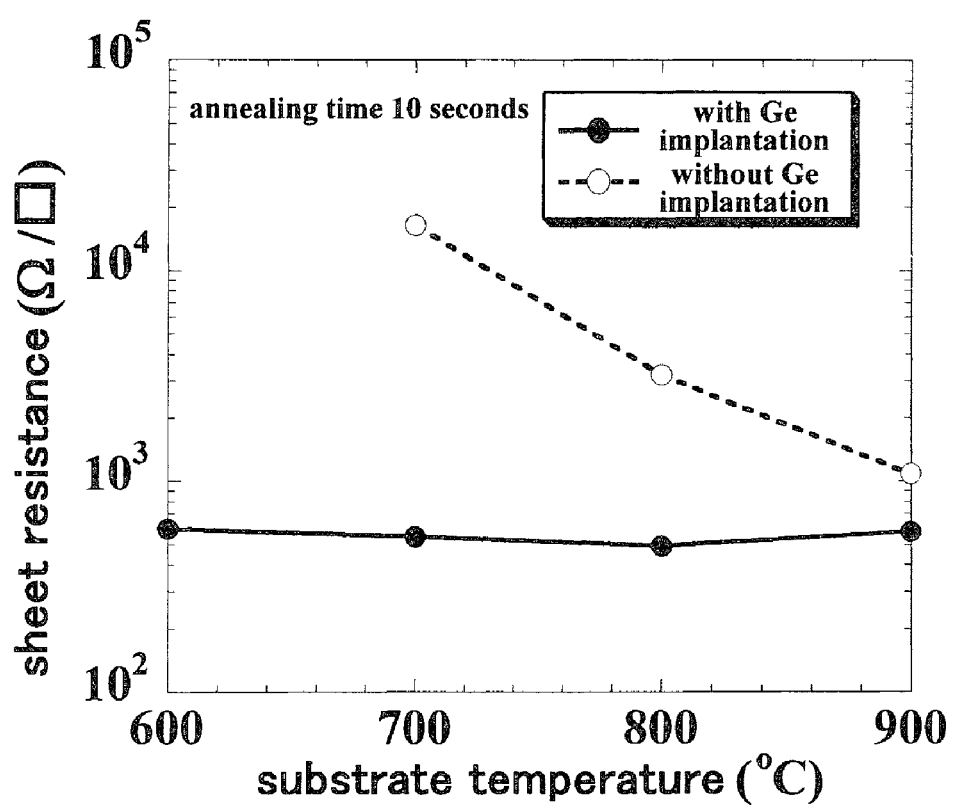
FIG. 3 is a graph obtained by investigating the relationship between the substrate temperature and the sheet resistance of the impurity diffusion region in the activation annealing shown in FIG. 1C.

FIG. 3 is a graph obtained by investigating the relationship between a substrate temperature of the above-mentioned activation annealing and a sheet resistance of the impurity diffusion region 2. Note that the processing time of the activation annealing is fixed at 10 seconds in this investigation. In addition, similar to FIG. 2, the comparative results are also shown in FIG. 2, which are obtained when the Ge ion-implanting was omitted and only B ion-implanting was carried out.

As shown in FIG. 3, the Ge ion implantation can sufficiently reduce the resistance of the impurity diffusion region 2 regardless of the substrate temperature. In contrast, in the case where Ge is not ion-implanted, the sheet resistance becomes higher when the substrate temperature is low. Thus, when Ge ion-implanting is omitted, it can be seen that a high substrate temperature is required for activating B in the impurity diffusion region 2.

Figure 4:
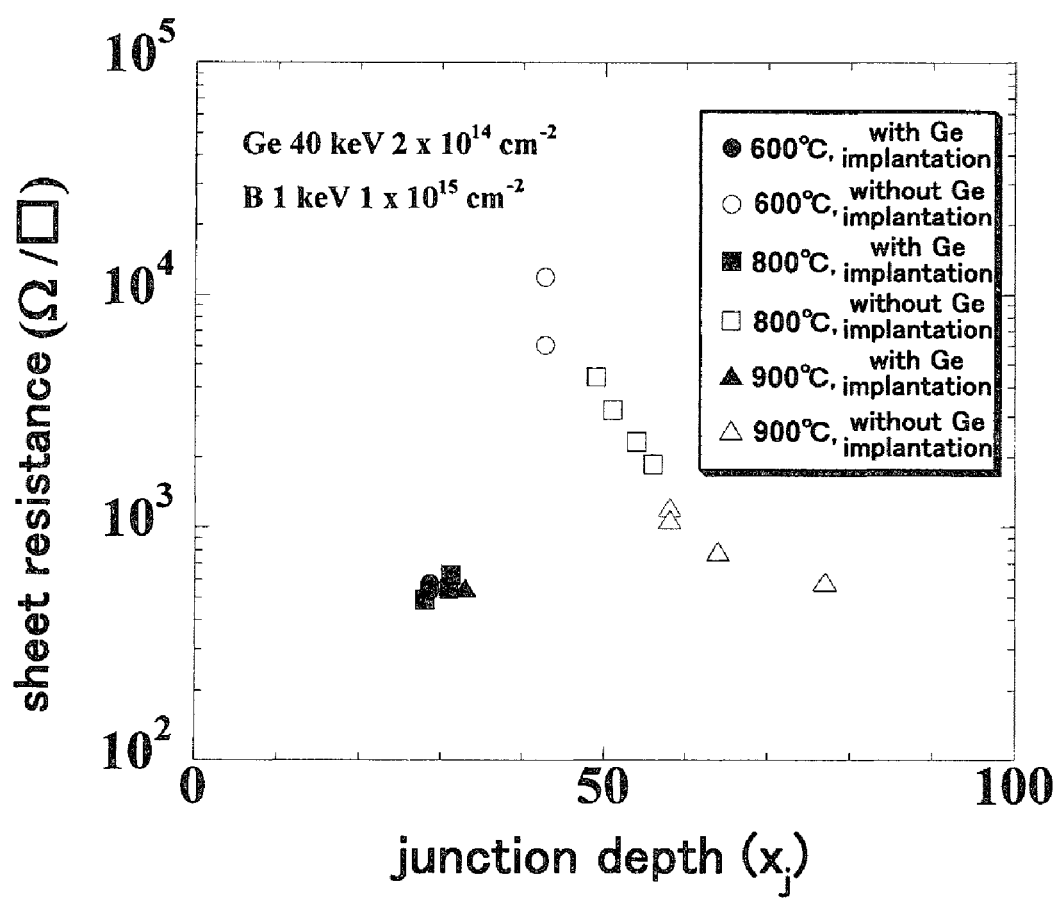
FIG. 4 is a graph obtained by investigating the relationship between the junction depth $x_j$ of the impurity diffusion region and the sheet resistance thereof while the substrate temperature of the activation annealing is changed variously.
Figure 5:
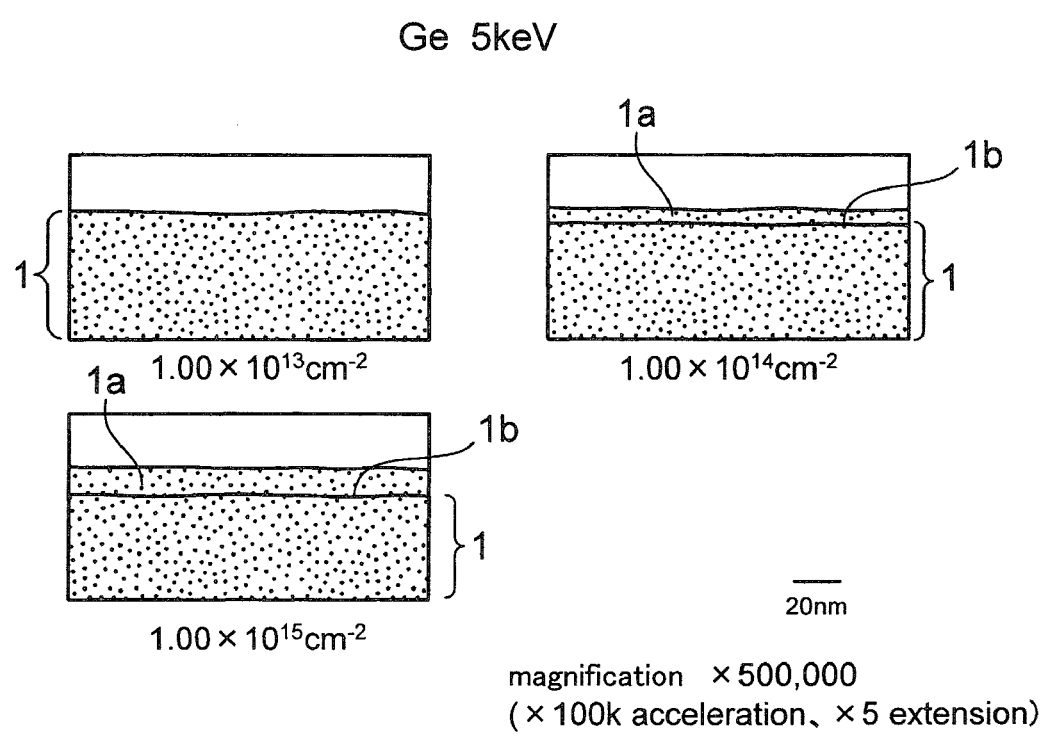
FIG. 5 is views (No. 1) drawn on the basis on an image obtained by observing a cross-section of a silicon substrate by a TEM after ion-implanting Ge.
Figure 6:
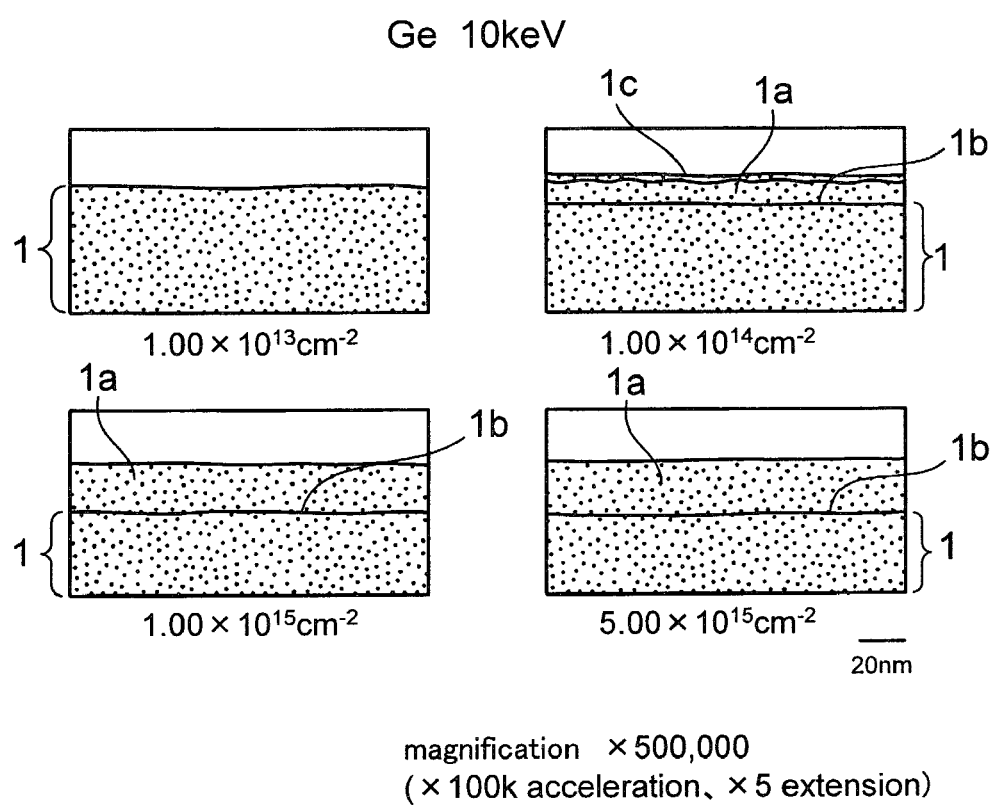
FIG. 6 is views (No. 2) drawn on the basis of an image obtained by observing a cross-section of a silicon substrate by a TEM after ion-implanting Ge.
Figure 7:
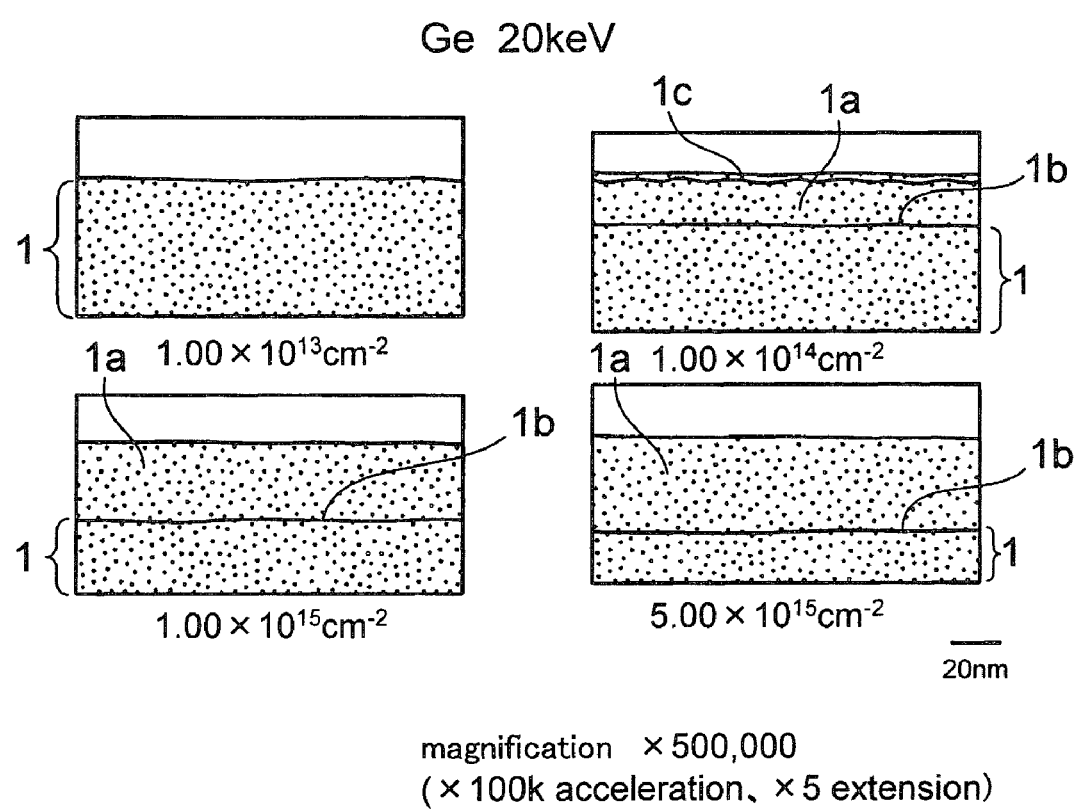
FIG. 7 is views (No. 3) drawn on the basis of an image obtained by observing a cross-section of a silicon substrate by a TEM after ion-implanting Ge.
Figure 8:
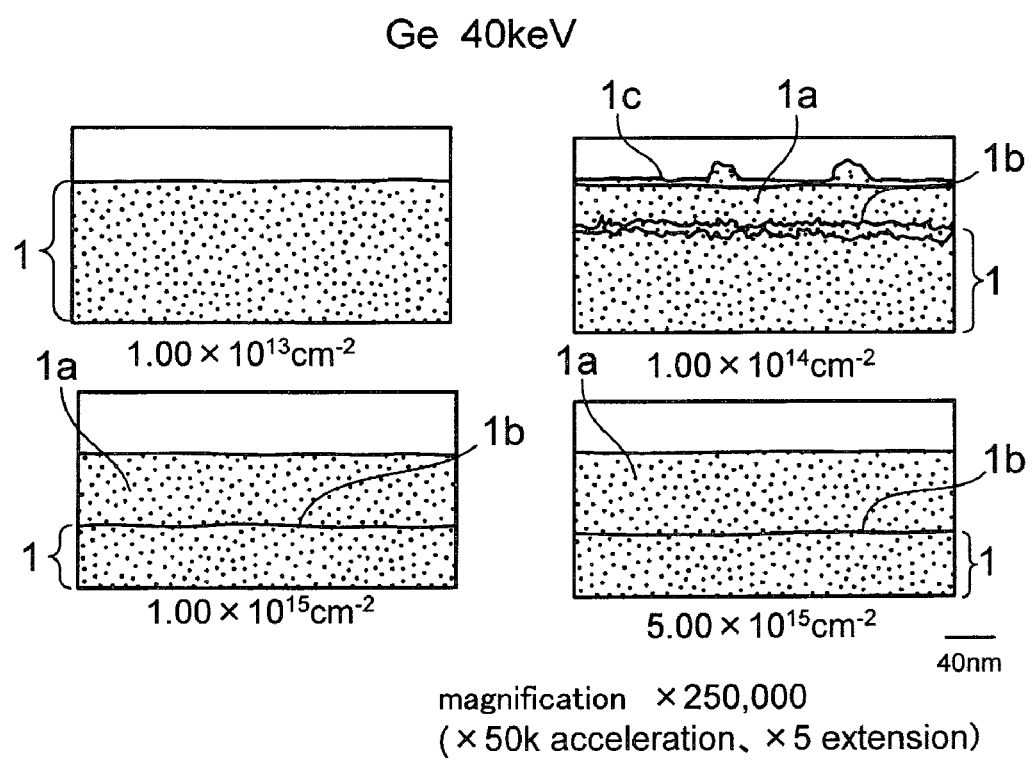
FIG. 8 is views (No. 4) drawn on the basis of an image obtained by observing a cross-section of a silicon substrate by a TEM after ion-implanting Ge.
Figure 9:
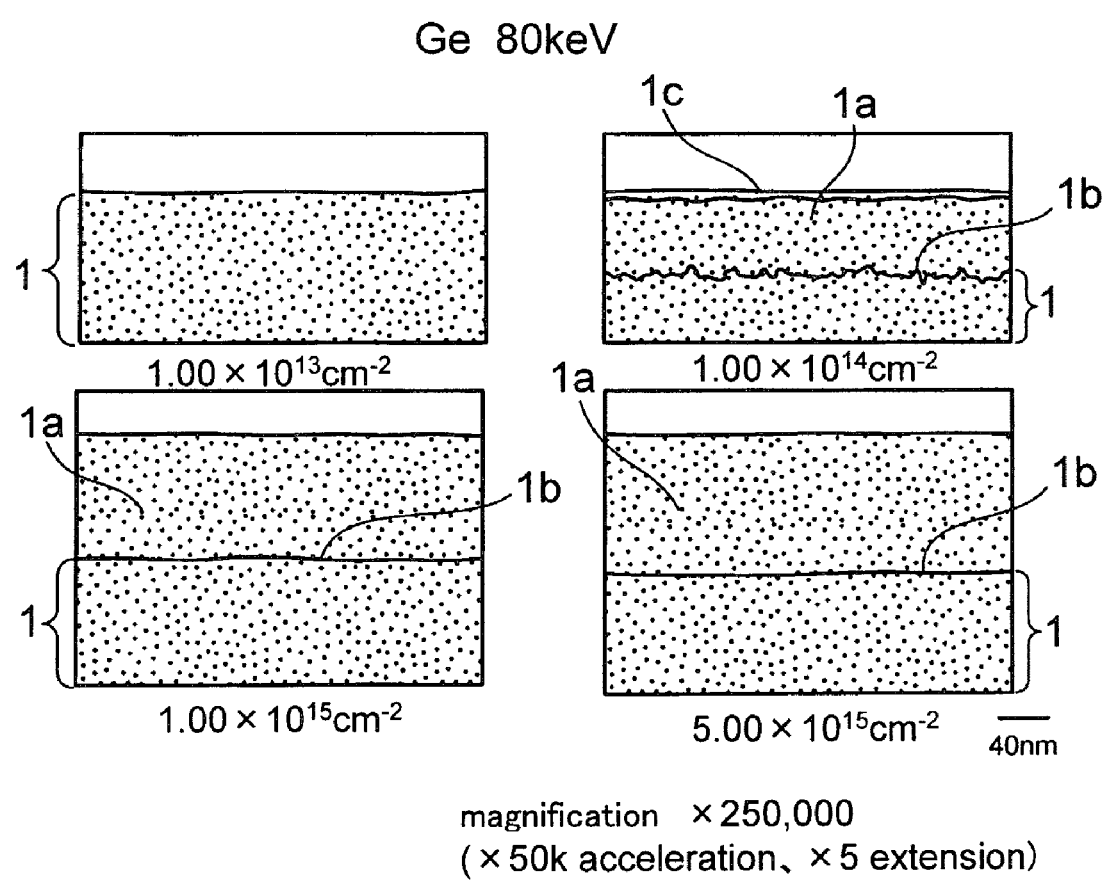
FIG. 9 is views (No. 5) drawn on the basis of an image obtained by observing a cross-section of a silicon substrate by a TEM after ion-implanting Ge.

FIG. 4 is a graph obtained by investigating the relationship between a junction depth $x_j$ (see FIG. 1C) of the impurity diffusion region 2 and the sheet resistance thereof while the substrate temperature in the activation annealing was variously changed. In FIG. 4, results of the cases where Ge was ion-implanted, and where Ge was not ion-implanted, are shown as well.

As shown in FIG. 4, in the case where Ge ion-implanted was omitted, the junction depth $x_j$ of the impurity diffusion region 2 and the sheet resistance thereof were greatly influenced by the substrate temperature in the activation annealing.

In contrast, when Ge ion-implanted was carried out, the above-mentioned junction depth $x_j$ and the sheet resistance can nearly be fixed without depending on the substrate temperature in the activation annealing. Thus, the junction depth $x_j$ and the sheet resistance can be determined only by the ion-implanting condition (implanting energy and a dose amount) for the B ion implantation for forming the impurity diffusion region 2.

(ii) Relationship Between Condition of Ge Ion Implantation and Thickness of Amorphous Layer FIGS. 5 to 9 are views drawn on the basis of images obtained by observing a cross section of the silicon substrate 1 by using a TEM (Transmission Electron Microscopy) after the Ge ion implantation described with FIG. 1A. Note that, in FIGS. 5 to 9, TEM images are obtained by variously changing the condition of the Ge ion implantation, and the implanting energy of the ion implantation is shown in the upper side of each of the drawing and the dose amount is shown in the lower side of each of the TEM images.

As shown in FIGS. 5 to 9, when the dose amount is $1 \times 10^{13}$ cm$^{-2}$, the amorphous layer 1a becomes discontinuous at any implantation energy.

When the dose amount is increased to $1 \times 10^{14}$ cm$^{-2}$, the amorphous layer 1a is continuously formed. However, an interface 1b between a non-amorphous crystal layer of the silicon substrate 1 and the amorphous layer 1a is not clear. In addition, in a vicinity of the upper surface of the amorphous layer 1a, a crystal layer 1c of silicon, which is not made into amorphous and remains in the crystallized state, is left.

In contrast, when the dose amount is increased to $1 \times 10^{15}$ cm$^{-2}$, the interface 1b between the amorphous layer 1a and the crystal layer becomes clear, and the crystal layer 1c was not left on the upper surface of the amorphous layer 1a.

Then, when the dose amount is further increased to $5 \times 10^{15}$ cm$^{-2}$, the interface 1b between the amorphous layer 1a and the crystal layer gradually moves deeply into the substrate.

Figure 10:
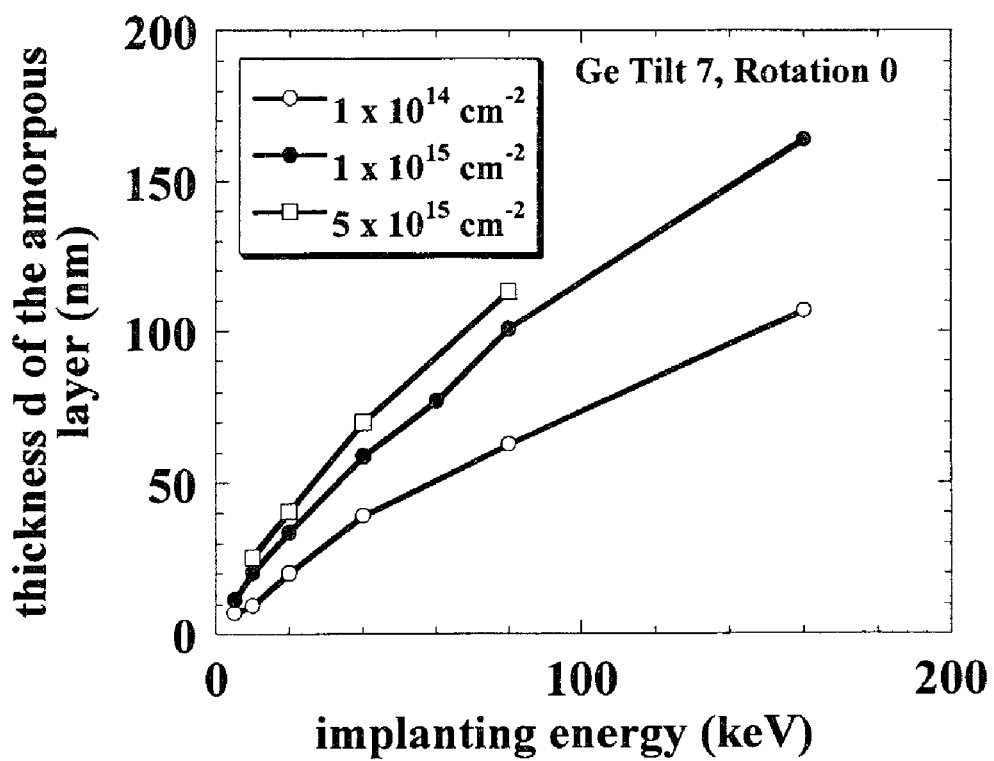
FIG. 10 is a graph obtained by investigating the relationship between the implanting energy of Ge and the thickness d of an amorphous layer on the basis of samples used in FIGS. 5 to 9.

FIG. 10 is a graph obtained by investigating the relationship between implanting energy of Ge and the thickness d (see FIG. 1C) of the amorphous layer 1a on the basis of the samples used in FIGS. 5 to 9. Note that the thickness d of the amorphous layer 1a was measured by visually reading scales displayed in the TEM images. In addition, in FIG. 10, a plurality of graphs was obtained for various dose amounts.

As shown in FIG. 10, the thickness d of the amorphous layer 1a increases as the implanting energy of Ge increases. The degree of increase is lower than the linear increase. In addition, in the case where the dose amount is $1 \times 10^{14}$ cm$^{-2}$, and the case where the dose amount is $1 \times 10^{15}$ cm$^{-2}$, the thickness of the amorphous layer 1a greatly depends on the dose amount. This is considered because the thickness of a transition layer, which is transiting from a crystal layer to an amorphous layer 1a, is large in the range of the dose amount from $1\times10^{14}$ cm$^{-2}$ to $1\times10^{15}$ cm$^{-2}$. In contrast, when the dose amount is larger than this, the thickness of the transition layer becomes substantially constant, and the degree of increase in the thickness of the amorphous layer $1a$ becomes gentle.

(iii) Description of Ion Implantation Database

During manufacturing processes of a semiconductor device such as an LSI, various ion implantation processes are performed. In such ion implantation processes, it is required to set implanting energy of ion implantation so that the designed impurity concentration distribution can be obtained. For this reason, in ordinal ion implantation processes, a database in which the impurity concentration distribution is corresponded to the implanting energy is referred, and then the implanting energy corresponding to the desired concentration distribution is extracted from the data base. Then, ion implantation is performed on a product semiconductor substrate with the extracted implanting energy.

A method of creating the database will be described below.

Figure 11A:
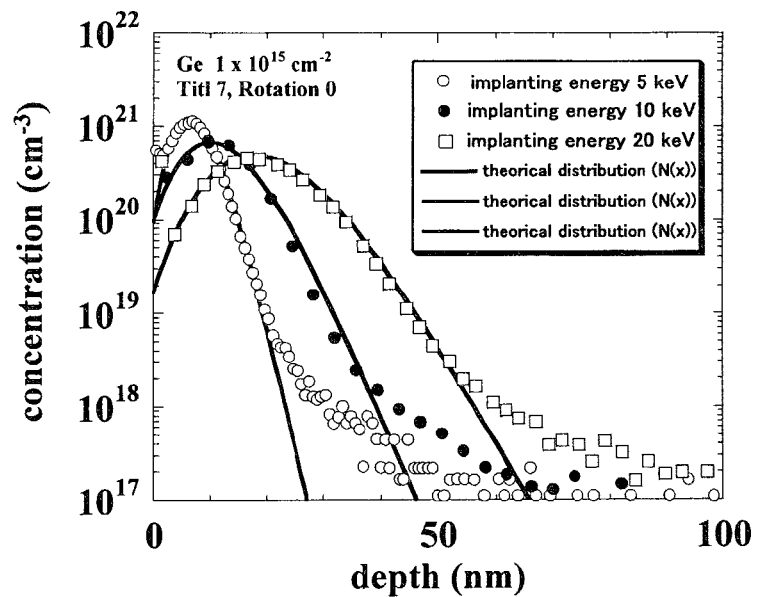
FIGS. 11A and 11B are graphs of Ge concentration distribution obtained by implanting Ge into a test silicon substrate under various conditions.
Figure 11B:
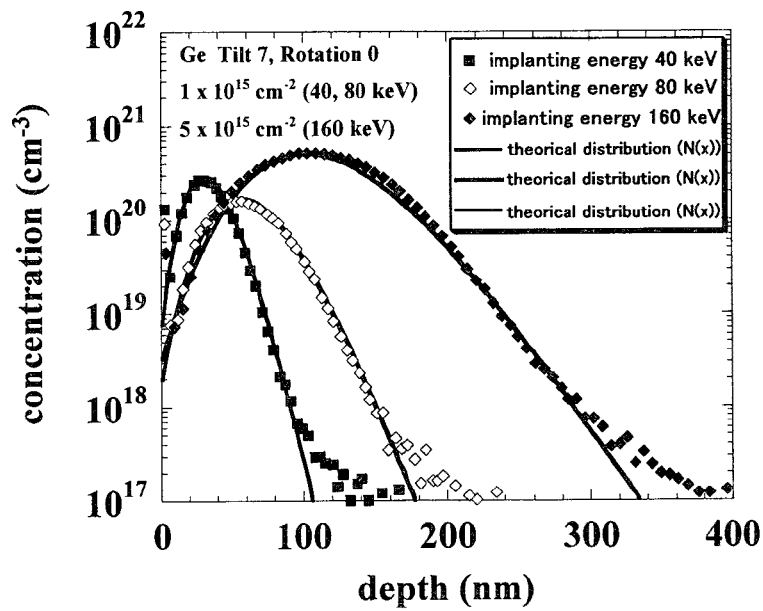

FIGS. 11A and 11B show Ge concentration distributions obtained by ion-implanting Ge into a test silicon substrate under various conditions, and the lateral axis shows the depth from the surface of the substrate, and the longitudinal axis shows the concentration. The concentration distributions were obtained by measuring the test silicon substrate with SIMS. Note that, in each ion implantation, the tilt angle was set at 7° and the rotation angle was set at 0°.

The example of FIG. 11A shows the concentration distribution of the case where the implanting energy was changed to 5 keV, 10 keV, and 20 keV when the dose amount was $1\times10^{15}$ cm$^{-2}$. Then, the example of FIG. 11B shows the concentration distribution of the case where the implanting energy was changed to 40 keV and 80 keV when the dose amount was $1\times10^{15}$ cm$^{-2}$. FIG. 11B also shows the concentration distribution of the case where the implanting energy was 160 keV and the dose amount was $5\times10^{15}$ cm$^{-2}$.

A curve shown by a solid line in each of FIGS. 11A and 11B illustrates approximate distribution N(x) obtained by approximating the above concentration distribution with $N(x)=\Phi\cdot I(x-R_p)$ by using a Pearson IV distribution function I(x). Here, $R_p$ is an ion range of the Ge concentration, and $\Phi$ is the dose amount. In addition, the Pearson IV distribution concentration I(y) is defined by the following differential equation (1):

$$\frac{dI(y)}{dy} = \frac{(y-a)I(y)}{b_0 + ay + b_2 y^2}. \quad (1)$$

Note that each coefficient in the equation 1 is defined by the following equations (2) to (5).

$$a = \frac{-\Delta R_p \gamma (\beta + 3)}{A} \quad (2)$$

$$b_0 = \frac{-\Delta R_p^2 \gamma (4\beta - 3\gamma^2)}{A} \quad (3)$$

$$b_2 = \frac{-2\beta + 3\gamma^2 + 6}{A} \quad (4)$$

$$A = 10\beta - \gamma^2 - 18 \quad (5)$$

In these equations (2) to (5), $\Delta R_p$ is standard deviation of the impurity concentration in a depth direction. In addition, $\gamma$ is skewness and $\beta$ is kurtosis. These $R_p$, $\Delta R_p$, $\gamma$, and $\beta$ characterize the form of the distribution N(x), and these will be referred to as "form parameters" below.

In the present embodiment, these form parameters are corresponded to the implanting energy E, and thus an ion implantation database 105 schematically shown in FIG. 12 is created. As shown in FIG. 12, in this example, the skewness $\gamma$ is 0.47 at any implanting energy E, which shows the distribution is sifted backwardly. In addition, since the kurtosis $\beta$ is 3.5, it is understood that this distribution is substantially Gaussian distribution.

These form parameters ($R_p$, $\Delta R_p$, $\gamma$, and $\beta$) vary depending on the kinds of impurities. Thus, it is preferable that the ion implantation database 105 be created for each impurity.

Figure 13:
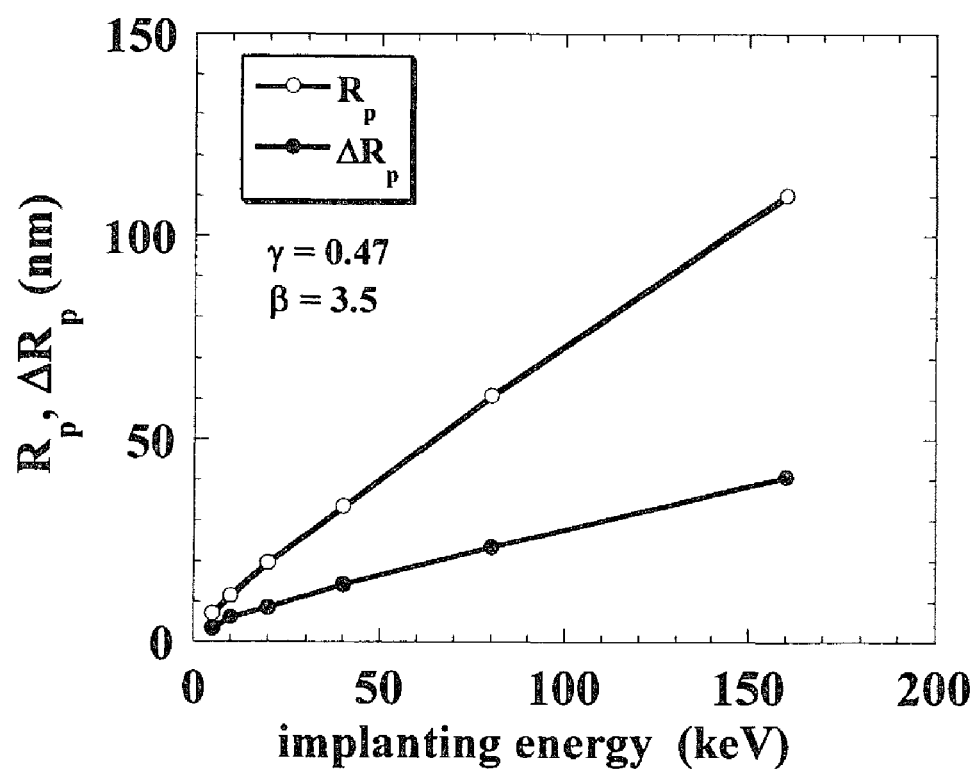
FIG. 13 is a graph showing dependency of each of an ion range $R_p$ and standard deviation $\Delta R_p$ on implanting energy E on the basis of the database of FIG. 12.

FIG. 13 is a graph showing dependency of an ion range $R_p$ on the implanting energy E. Dependency of standard deviation $\Delta R_p$ on the implanting energy E is also shown in FIG. 13. These graphs were made based on the database of FIG. 12.

(iv) Method of Evaluating Thickness of Amorphous Layer

FIGS. 14 to 16A are graphs each showing approximate distribution N(x) of a Ge concentration of each sample of FIGS. 5 to 9. In addition, FIG. 16B is a graph showing approximate distribution N(x) of the Ge concentration which is obtained by setting the implanting energy at 160 keV.

The form parameters ($R_p$, $\Delta R_p$, $\gamma$, and $\beta$) corresponding to the implanting energy of each sample is acquired from the database in FIG. 12, and the Pearson IV distribution function I(x) is created from the acquired form parameters, and then the approximate distributions N(x) are obtained as $N(x)=\Phi\cdot I(x-R_p)$. Note that $\Phi$ is a dose amount of each sample.

In addition, in the curves shown in FIGS. 14 to 16, an upward arrow shows the position of an interface between the amorphous layer and the crystal layer (hereinafter referred to as an a/c interface) in the sample shown by the arrow, and the lateral coordinate of the arrow is the depth of the a/c interface. Note that an amorphous layer is not formed in the sample with the dose amount of $1\times10^{13}$ cm$^{-2}$ as shown in FIGS. 5 to 9. Therefore, the arrows are not given to the approximate distribution N(x) of the sample with the dose amount of $1\times10^{13}$ cm$^{-2}$.

Figure 14A:
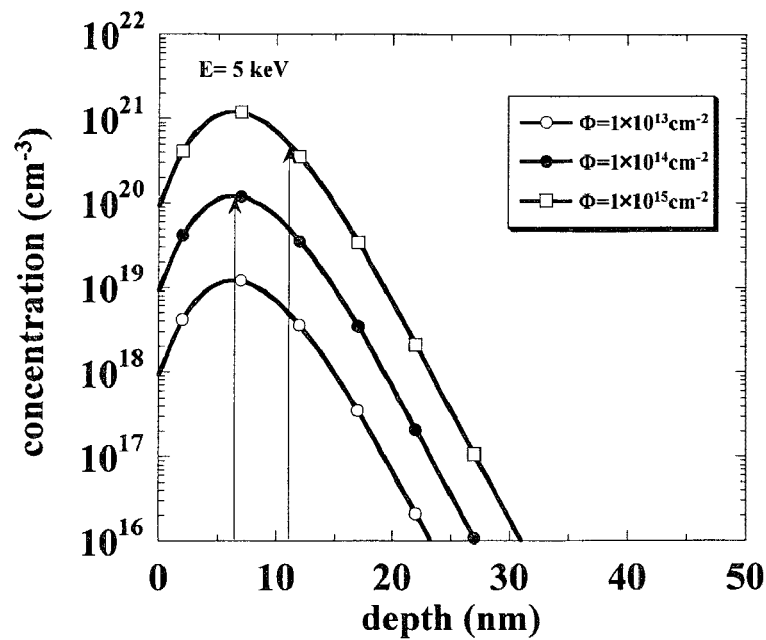
FIGS. 14A and 14B are graphs, each showing approximate distribution N(x) of each of Ge concentrations of the samples in FIGS. 5 and 6.
Figure 14B:
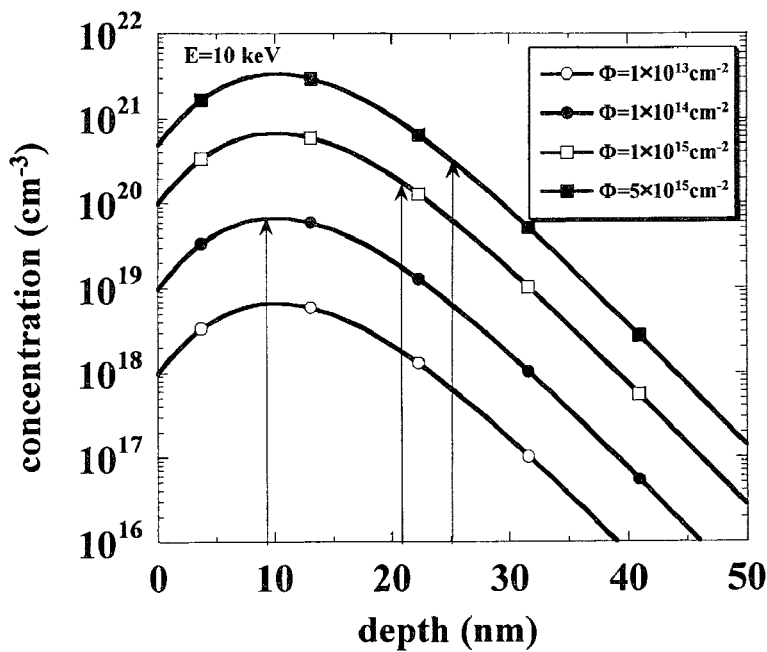
Figure 15A:
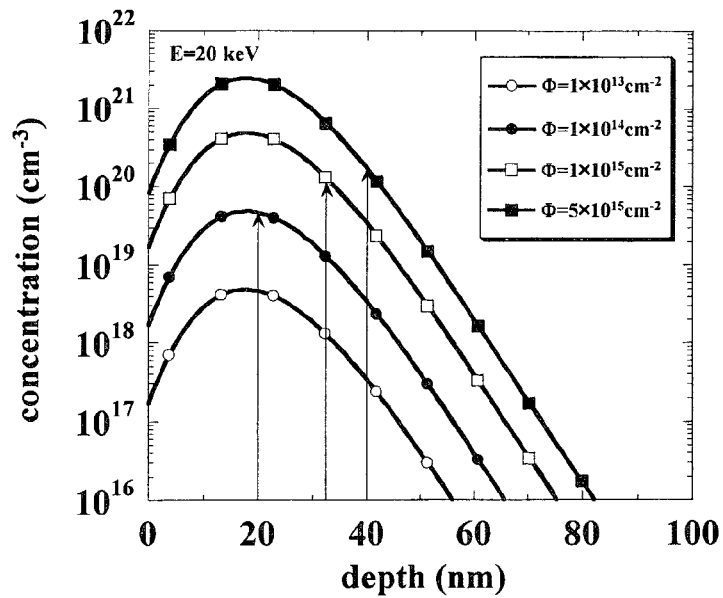
FIGS. 15A and 15B are graphs, each showing approximate distribution N(x) of each of Ge concentrations of the samples in FIGS. 7 and 8.
Figure 15B:
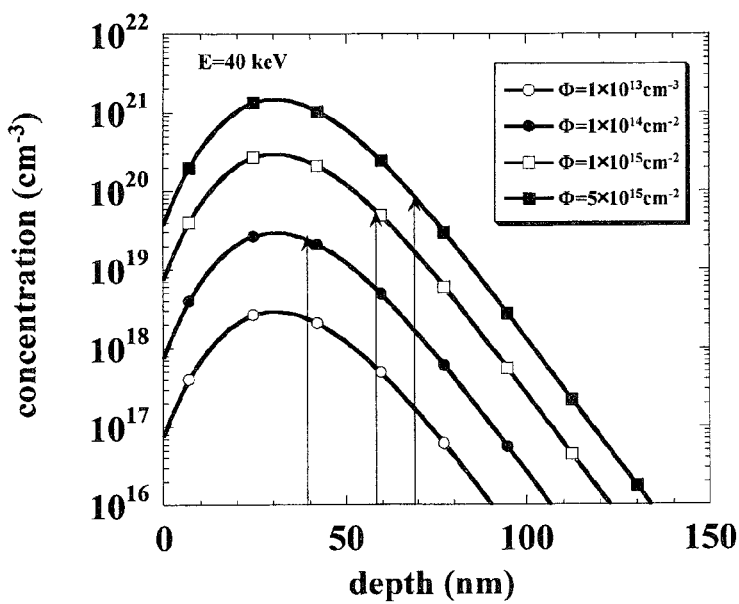
Figure 16A:
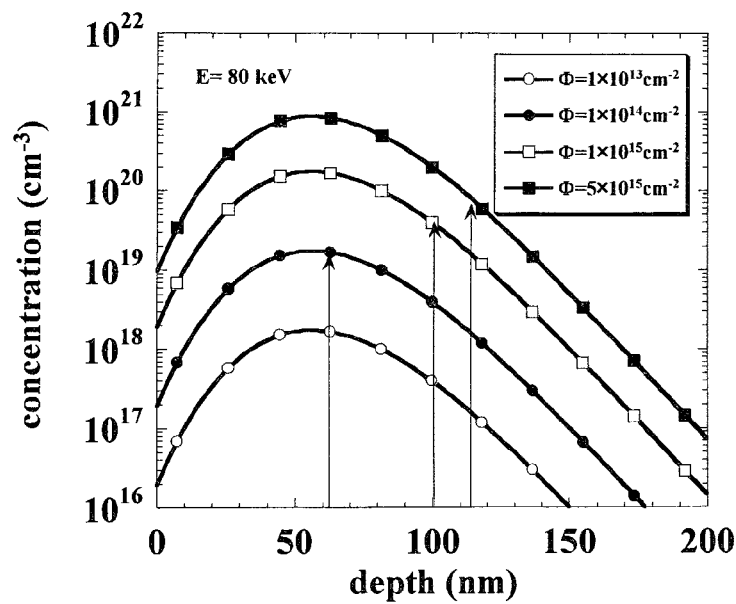
FIG. 16A is a view showing approximate distribution N(x) of the Ge concentration of the sample of FIG. 9.
Figure 16B:
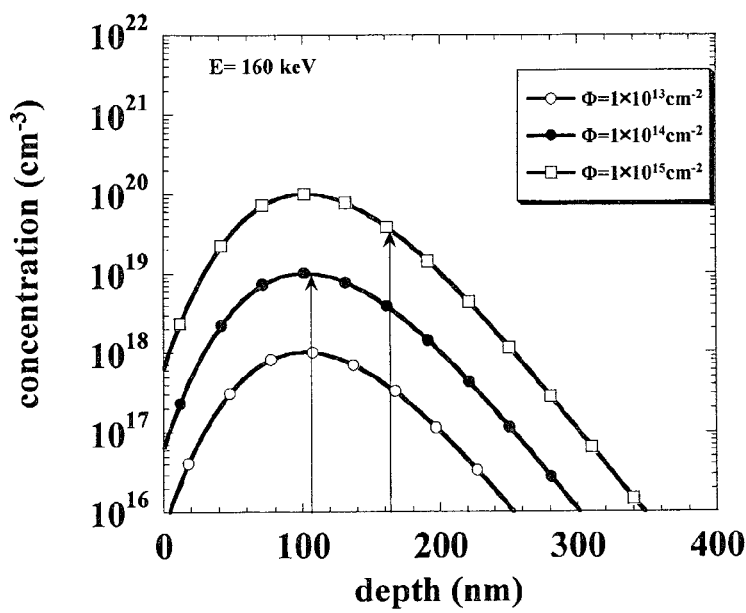
FIG. 16B is a graph showing approximate distribution N(x) of Ge concentration obtained by setting the implanting energy at 160 keV.

As shown in FIGS. 14 to 16, the depth of the a/c interface (i.e., the thickness d of the amorphous layer) shows different values depending on the samples.

There are possibly many factors that determine this depth of the a/c interface. For example, when the Ge concentration at the a/c interface is constant in any samples, the position of the a/c interface can be known by specifying the Ge concentration.

Figure 17:
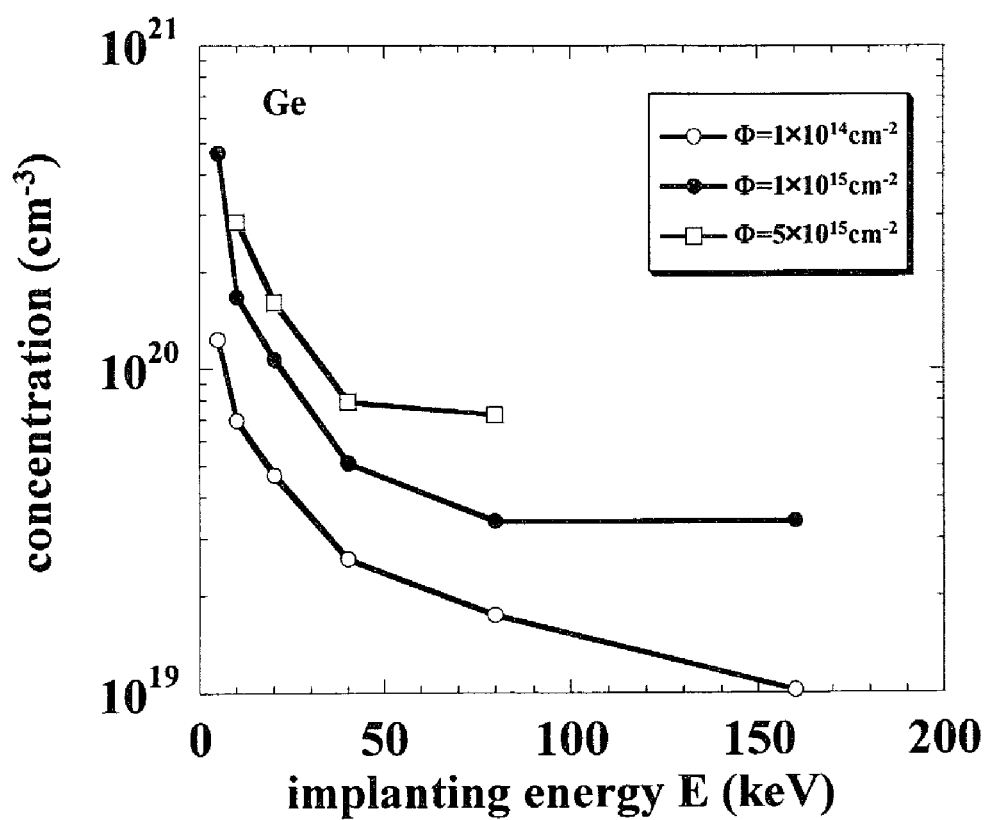
FIG. 17 is a graph showing the relationship between implanting energy E of ion implantation and a Ge concentration in the interface between an amorphous layer and a crystal layer.

FIG. 17 is a graph showing a relationship between the implanting energy E of the ion implantation and the Ge concentration at the a/c interface, and is obtained on the basis of FIGS. 14 to 16.

As shown in FIG. 17, the Ge concentration at the a/c interface greatly depends on the implanting energy E and the dose amount $\Phi$, and the order of the Ge concentration is different for some samples. Therefore, the depth of the a/c interface cannot be uniquely determined by use of the Ge concentration at the a/c interface.

Here, the amorphous layer $1a$ (see, FIG. 1(a)) formed in the silicon substrate 1 is formed by Ge that is implanted deeper than the amorphous layer $1a$ at the time of its implantation. Thus, it is considered that the position of the a/c interface can be specified by the total number of Ge in the portion deeper than the amorphous layer $1a$. Such a total number of Ge will be referred to as "through dose $\Phi_{a/c}$" in the following.

Figure 18:
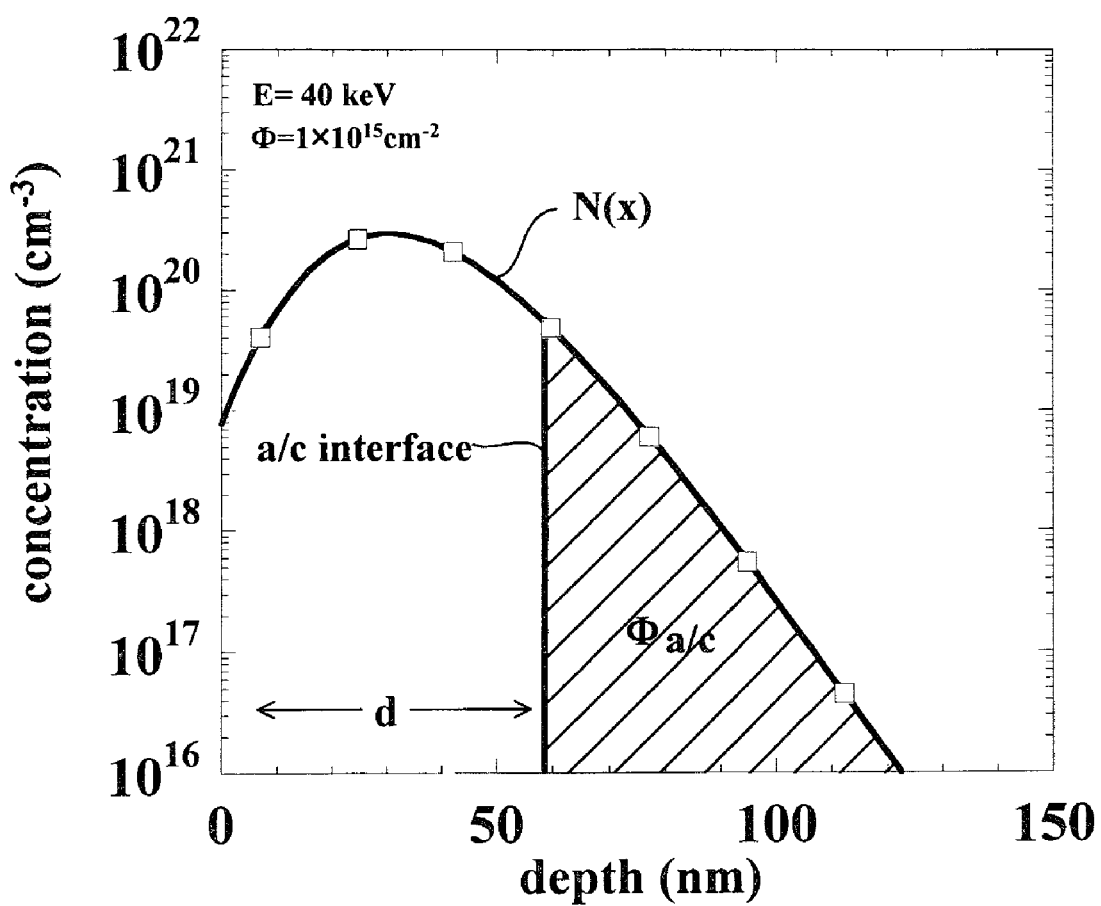
FIG. 18 is a graph for illustrating a method of calculating a through dose $\Phi_{a/c}$.

FIG. 18 is a graph for illustrating a method of calculating the through dose $\Phi_{a/c}$ from the approximate distribution N(x) described in FIGS. 14 to 16. Note that, in FIG. 18, the approximate distribution N(x) in the case where the implanting energy E is 40 keV and the dose amount is $1×10^{15}$ cm$^{-2}$ is used as an example.

The through dose $\Phi_{a/c}$ is defined as the total number of Ge atoms which are implanted into a portion deeper than the amorphous layer. Therefore, as shown in the following equation (6), the through dose $\Phi_{a/c}$ can be calculated as an integral value which is obtained by integrating the approximation distribution N(x) from d to infinite.

$$\Phi_{a/c} = \int_{d}^{\infty} N(x) dx \quad (6)$$

Figure 19:
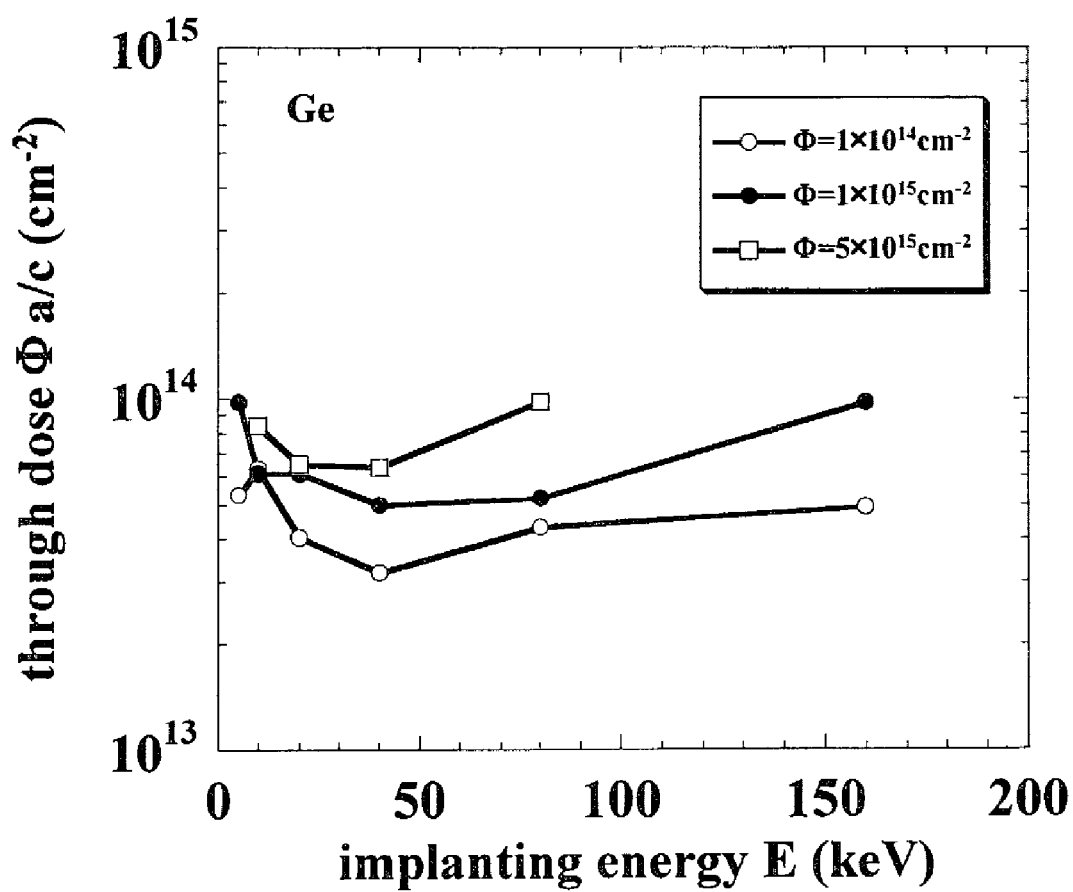
FIG. 19 is a graph showing the relationship between a through dose $\Phi_{a/c}$ calculated by using approximate distribution N(x) of each of FIGS. 14 to 16 and implanting energy E.

FIG. 19 is a graph showing a relationship between the through dose $\Phi_{a/c}$, which is calculated by using the approximate distribution N(x) of each of FIGS. 14 to 16, and the implanting energy E.

As shown in FIG. 19, when the same impurity is used, the through dose $\Phi_{a/c}$ is approximately constant regardless of the implantation conditions such as the implanting energy E and the dose amount $\Phi$. Further, the order of the through dose $\Phi_{a/c}$ does not vary.

As will be described below, the through dose $\Phi_{a/c}$ with such characteristics is used to obtain the thickness of the amorphous layer in the present embodiment.

(v) Description of a Simulating Method of Ion Implantation

Figure 20:
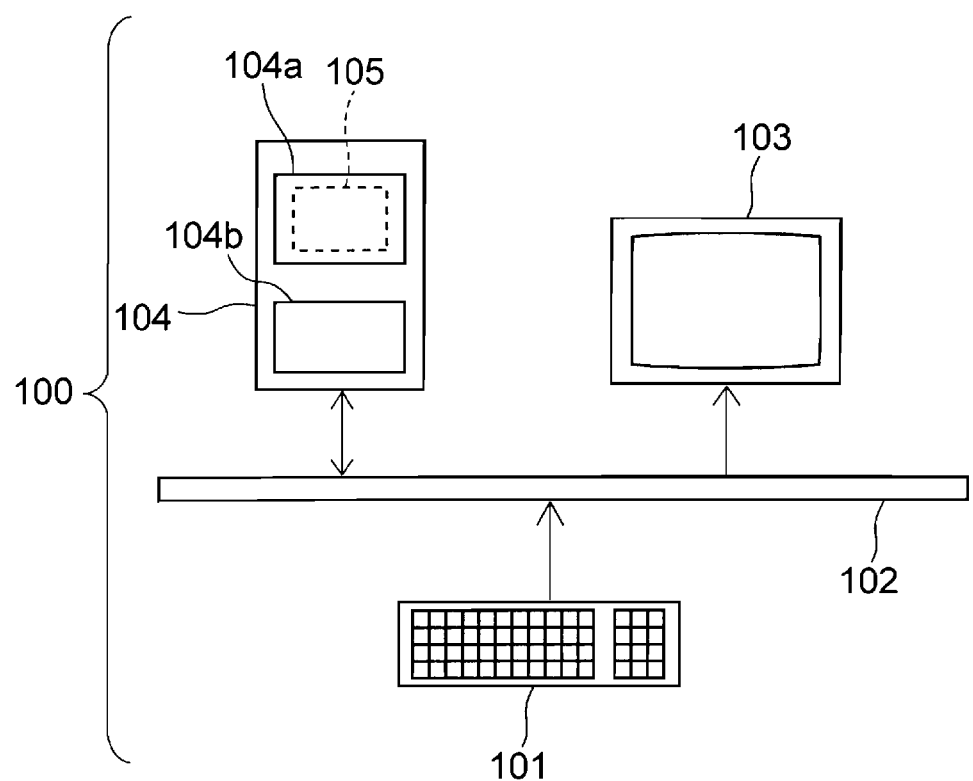
FIG. 20 is a configurational view of a simulator which is used in a first embodiment.

FIG. 20 is a configurational view of a simulator used in this simulating method.

A simulator 100 includes a keyboard 101 by which a user inputs data, a control unit 104, and a monitor 103 in which an operational result in the control unit 104 or the like is displayed. The delivery of data among these units is performed via a bus 102. The control unit 104 is, for example, a personal computer or a workstation, and includes a storage unit 104a such as a hard disk, and an operation unit 104b such as a CPU. Of these, in the storage unit 104a, the ion implantation database 105, which is described in FIG. 12, is stored.

Figure 21:
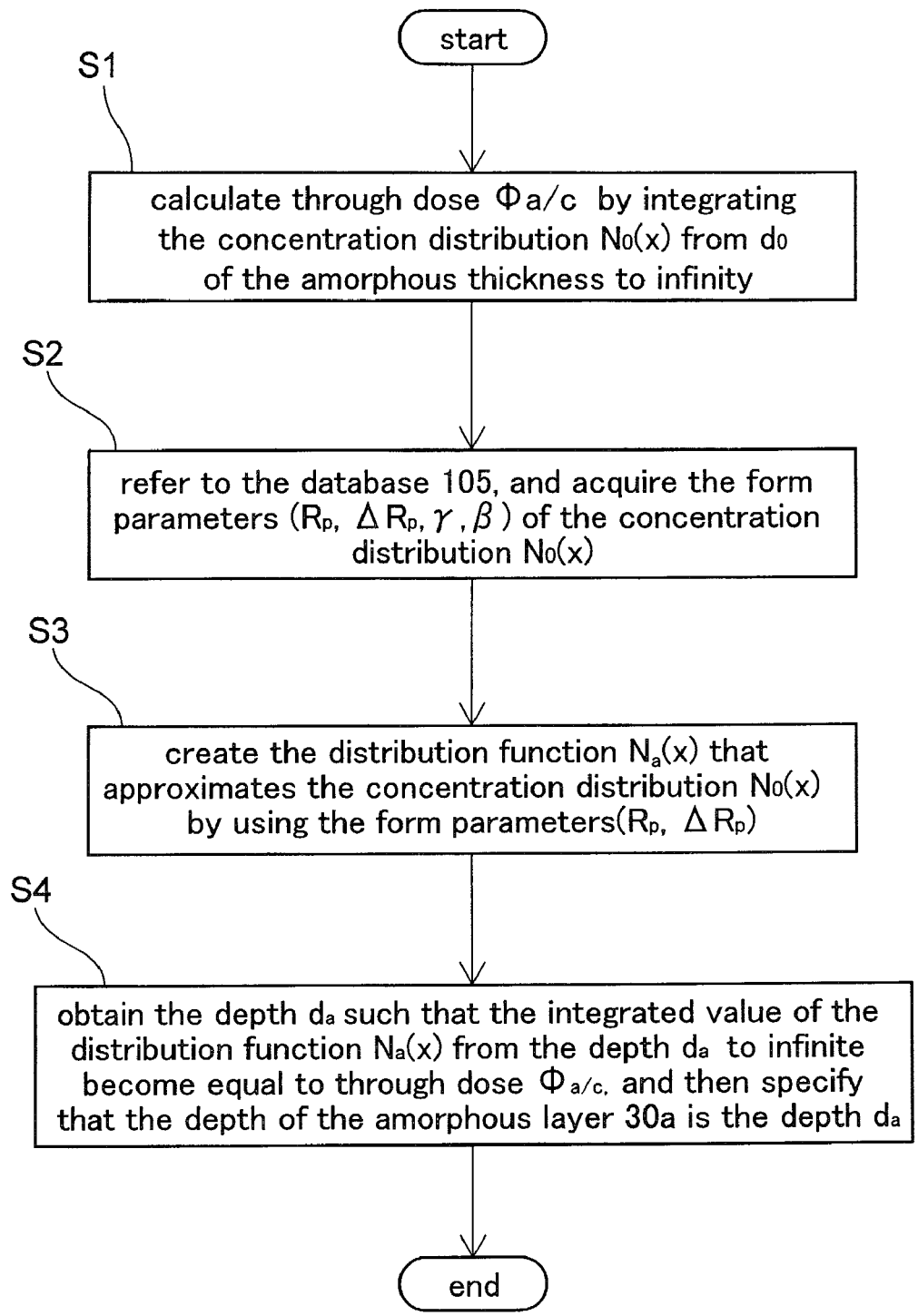
FIG. 21 is a flowchart showing a simulation method according to the first embodiment.
Figure 22:
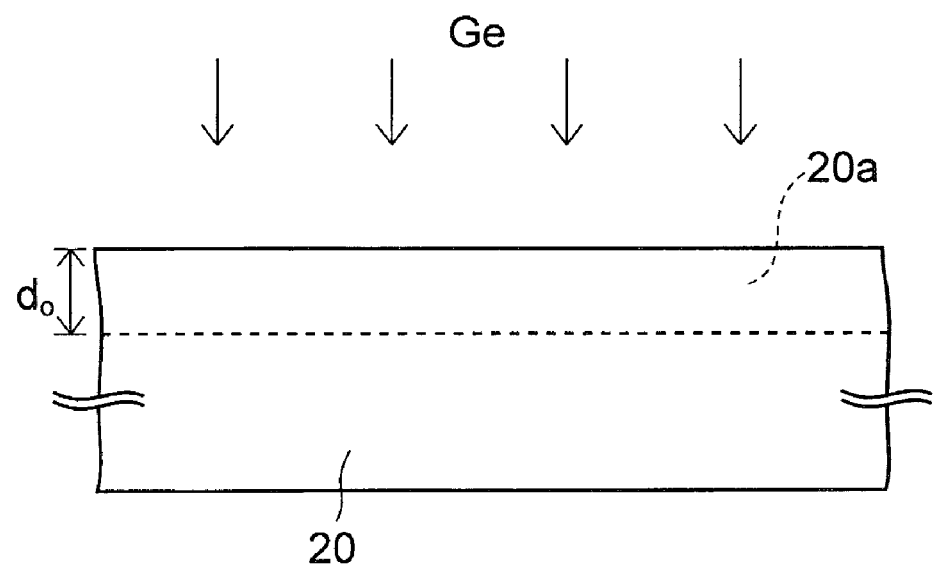
FIG. 22 is a cross-sectional view of a test silicon substrate which is used in the first embodiment.

FIG. 21 is a flowchart showing the simulating method using this simulator. FIG. 22 is a cross-sectional view of a test silicon substrate (a crystalline substrate) 20 to be used in this method.

At the first step S1 of FIG. 21, as shown in FIG. 22, Ge is ion-implanted into the test silicon substrate (the crystalline substrate) 20 under arbitrary test conditions (implanting energy $E_0$ and the dose amount $\Phi_0$). By ion-implanting Ge in this manner, an amorphous layer 20a is formed in a surface layer portion of the test silicon substrate 20.

After that, the thickness $d_0$ of the amorphous layer 20a is measured by a TEM.

Next, the test conditions (the implanting energy $E_0$ and the dose amount $\Phi_0$) are inputted from the input unit 101 to the control unit 104 in FIG. 21. Then, the control unit 104 refers the ion implantation database 105 in the storage unit 104a to acquire form parameters $R_p$, $\Delta R_p$, $\gamma$, and $\beta$ (see, FIG. 12) that correspond to the above-mentioned conditions.

Figure 23:
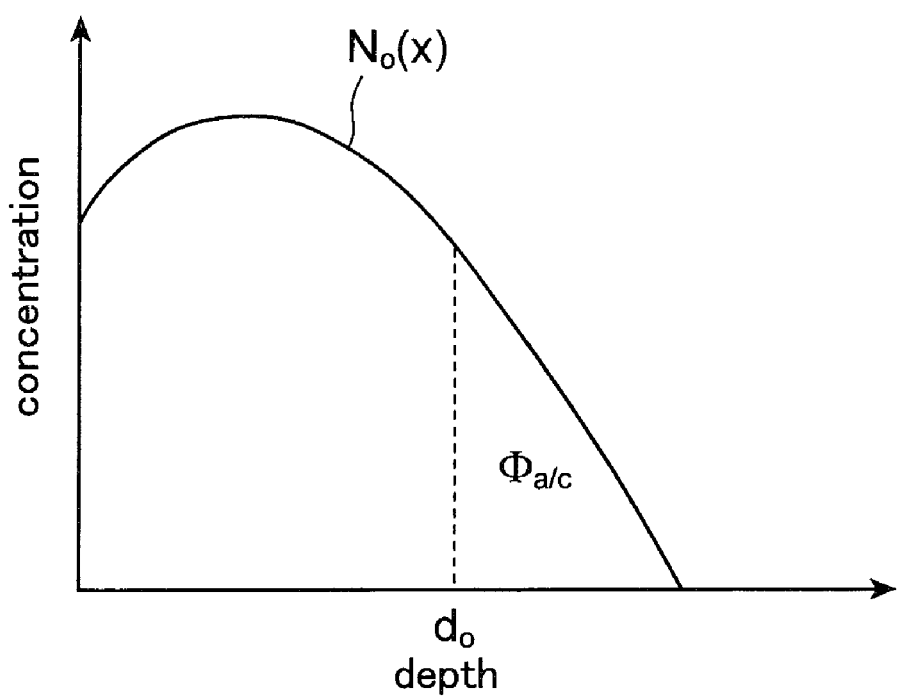
FIG. 23 is a graph showing an example of the Ge concentration distribution $N_0(x)$, which is generated by the simulator used in the first embodiment.

Furthermore, the control unit 105 creates a Pearson IV distribution function I(x) by using these form parameters. Then, the control unit 105 creates $N_0(x) = \Phi_0 \cdot I(x-R_p)$, which is formed by multiplying the dose amount $\Phi_0$ to this distribution function I(x), as Ge concentration distribution. The concentration distribution $N_0(x)$ has a shape shown in FIG. 23, for example.

Then, in the control unit 105, this concentration distribution $N_0(x)$ is integrated from $d_0$ to infinite to calculate an integrated value as through dose $\Phi_{a/c}$.

Note that in the forgoing description, the through dose $\Phi_{a/c}$ is obtained from one test condition (the implementing energy $E_0$ and the dose amount $\Phi_0$). However, since the through dose $\Phi_{a/c}$ becomes substantially constant regardless of conditions as described in FIG. 19, a plurality of through doses $\Phi_{a/c}$ may be calculated under a plurality of different ion implantation conditions. In this case, a mean value of the calculated through doses may be used as the through dose $\Phi_{a/c}$ in the following steps. By doing so, statistical reliability of the through dose $\Phi_{a/c}$ increases.

Furthermore, although the Pearson IV distribution function is employed as the distribution function I(x) in the forgoing description, a Gaussian distribution function may be employed instead.

Step S1 is completed with the above.

Next, the step proceeds to step S2 of FIG. 21.

Figure 24:
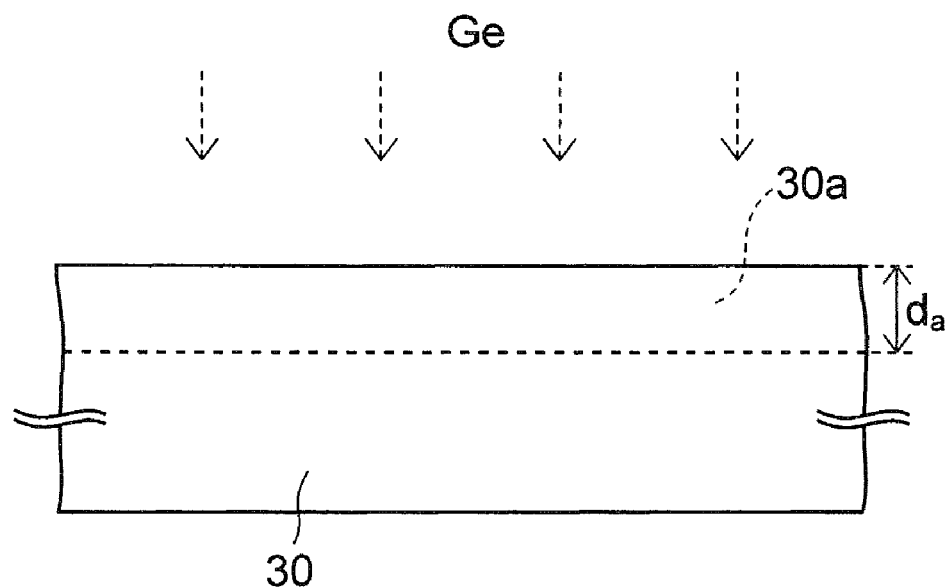
FIG. 24 is a cross-sectional view of a product silicon substrate which is used in the first embodiment.

In step S2, the implanting energy E of ion implantation for a product silicon substrate 30 shown in FIG. 24 is inputted to the keyboard 101 of FIG. 21. In response to this, the control unit 104 refers to the ion implantation database 105 (see FIG. 12) to acquire form parameters ($R_p$, $\Delta R_p$, $\gamma$, and $\beta$) that correspond to the inputted implanting energy E. Note that, as will be described later, only $R_p$ and $\Delta R_p$ are used, and $\gamma$ and $\beta$ are not used in the present embodiment. The acquired form parameters ($R_p$, $\Delta R_p$, $\gamma$, and $\beta$) are parameters of Ge concentration distribution N(x), which are obtained by ion-implanting Ge under the ion implanting condition for the above-mentioned product silicon substrate 30.

Next, the step proceeds to step S3. In the step S3, the control unit 104 creates a distribution function $N_a(x)$ which approximates the Ge concentration distribution N(x) by using the form parameters ($R_p$ and $\Delta R_p$) acquired as above. In the present embodiment, a Gaussian distribution function $N_a(x)$ defined by the following equation (7) is created as the distribution function.

$$N_a(x) = \frac{\Phi}{\sqrt{2\pi}\,\Delta R_p} \exp\left[-\left(\frac{x-R_p}{\sqrt{2}\,\Delta R_p}\right)^2\right] \quad (7)$$

Here, $\Phi$ is a dose amount to be used in ion implantation for a product silicon substrate. This distribution function $N_a(x)$ approximates the Ge concentration distribution obtained under the ion implantation condition used for the product silicon substrate.

Next, the step proceeds to step S4. In the step S4, as in the following equation (8), the integral value obtained by integrating the distribution function $N_a(x)$ from the depth $d_a$ to infinite is set equal to the through dose $\Phi_{a/c}$ calculated in the step S1.

$$\Phi_{a/c} = \int_{d_a}^{\infty} N_a(x) dx \quad (8)$$
$$= \int_{d_a}^{\infty} \frac{\Phi}{\sqrt{2\pi}} \exp\left[-\left(\frac{x-R_p}{\sqrt{2}\,\Delta R_p}\right)^2\right] dx$$
$$= \frac{\Phi}{2} erfc\left(\frac{d_a - R_p}{\sqrt{2}\,\Delta R_p}\right)$$

Here, erfc(x) is an error function. Then, a reverse function $erfc^{-1}(x)$ of the error function is used to solve equation (8) for $d_a$, so that following equation (9) is obtained.

$$d_a = R_p + \sqrt{2}\,\Delta R_p\, erfc^{-1}\left(\frac{2\Phi_{a/c}}{\Phi}\right) \qquad (9)$$

The control unit 104 uses equation (9) to numerically calculates $d_a$ from the given $R_p$, $\Delta R_p$, $\Phi_{a/c}$. After that, the control unit 104 specify that the thickness of the amorphous layer 30a (see, FIG. 24) formed in the product silicon substrate 30 is $d_a$ thus obtained.

With this, main steps of the simulating method of the ion implantation according to the present embodiment are completed.

Figure 25:
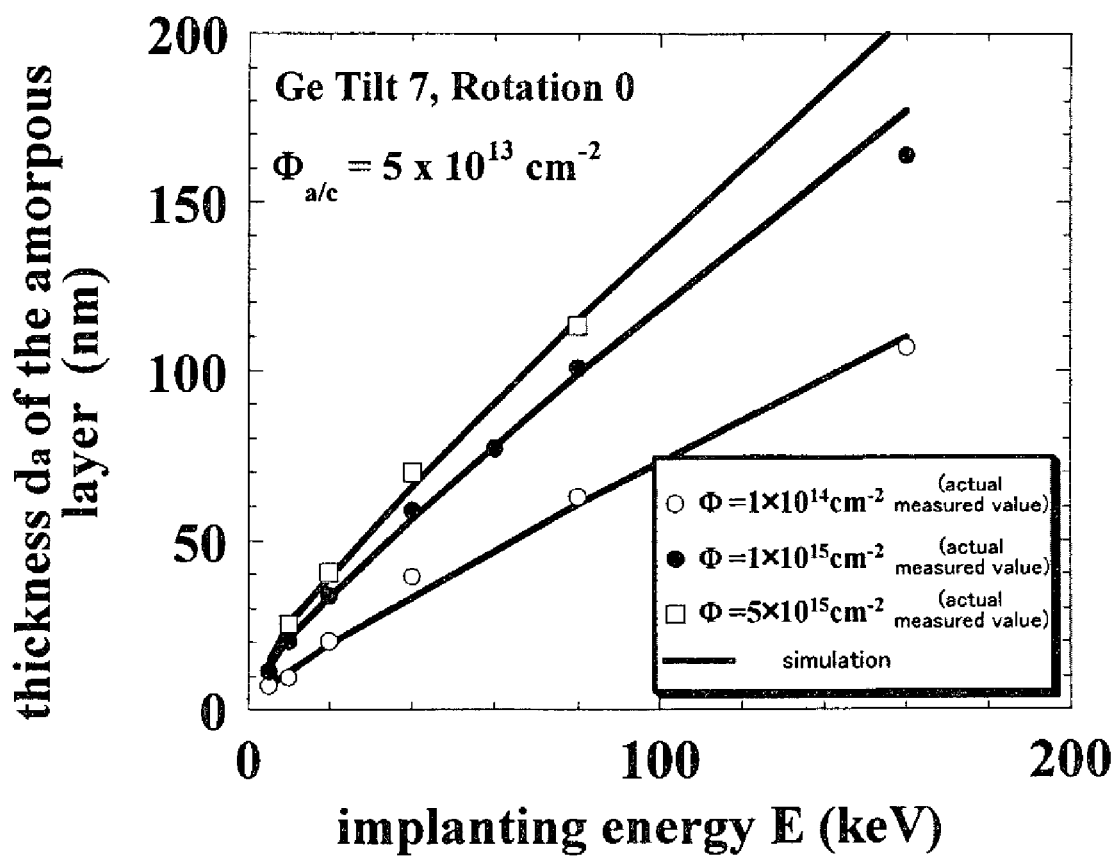
FIG. 25 is a graph showing the relationship between implanting energy E and the thickness $d_a$ of the amorphous layer in the case where the through dose $\Phi_{a/c}$ is set at $5 \times 10^{13}$ cm$^{-2}$.

FIG. 25 is a graph showing a relationship between the implanting energy E and the thickness $d_a$ of the amorphous layer in the case where the through dose $\Phi_{a/c}$ is set at $5\times10^{13}$ cm$^{-2}$. Note that in FIG. 25, actually measured thicknesses of the amorphous layer are also plotted for comparison.

As shown in FIG. 25, the graph obtained by the simulation agrees well with the actually measured thickness on a level which does not cause any practical problem.

In this simulation method, as a distribution function to approximate the Ge concentration distribution in the product silicon substrate 30, a Gaussian distribution function $N_a(x)$ shown in the equation (8) is employed. However, the approximation using the Gaussian distribution function is rough. Therefore, it is expected that the simulation result could be made closer to the actual measured thickness when the Pearson IV distribution function, which approximates more precisely than the Gaussian distribution function, is used for the above-mentioned function $N_a(x)$.

Figure 26:
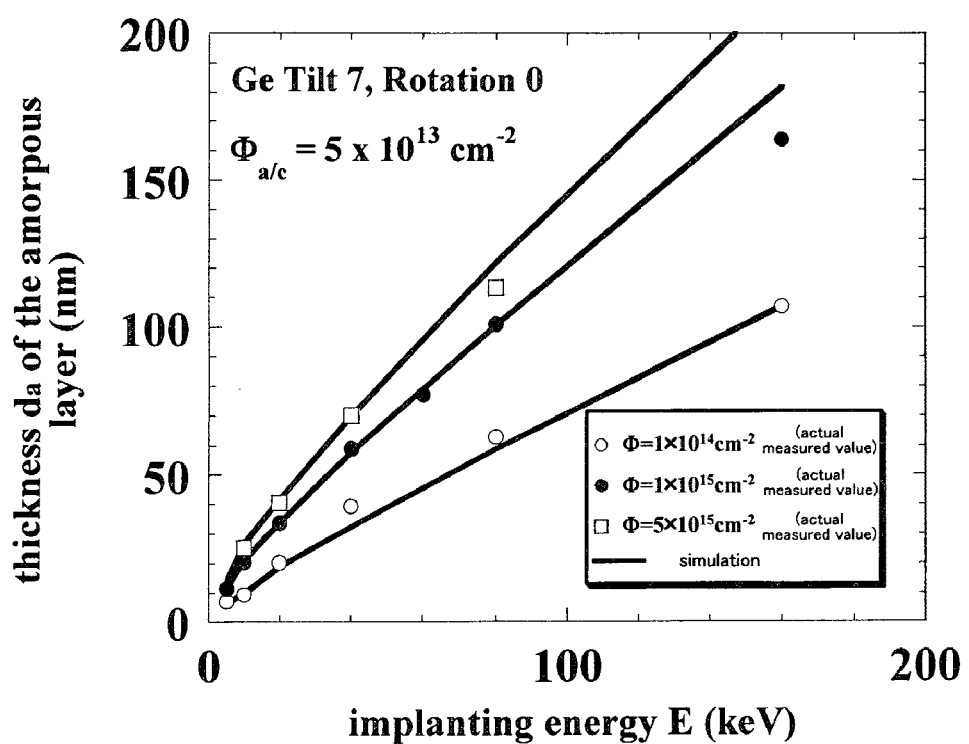
FIG. 26 is a graph showing a simulation result which is obtained by using a Pearson IV distribution function as a distribution function approximating Ge concentration distribution in the first embodiment.

FIG. 26 is a graph showing simulation results obtained by using the Pearson IV distribution function in this manner. Note that, as shown in equation (1) to (5), γ and β are also required in addition to $R_p$ and $\Delta R_p$ to create the Pearson IV distribution function. Thus, in above-described step S3, these form parameters ($R_p$, $\Delta R_p$, γ, and β) are used to create the Pearson IV distribution function in accordance with equations (1) to (5).

It can be seen that there is no major difference between FIGS. 25 and 26. Reason for this is considered as follows. That is, since through dose $\Phi_{a/c}$ used in the simulation is a macro parameter, differences in local behaviors of the distribution function are difficult to be reflected on the simulation results.

From this result, it can be seen that the Gaussian distribution function, which is easy to perform calculation, is sufficient as the distribution function $N_a(x)$ which approximates the impurity concentration distribution $N_0(x)$.

In the above-described present embodiment, as described at the step S4 of FIG. 21, such a depth $d_a$ that the integral value when the distribution function $N_a(x)$ is integrated from the depth $d_a$ to infinite becomes the through dose $\Phi_{a/c}$, is obtained, and then it is specified that the thickness of the amorphous layer 30a formed by ion-implanting Ge under the condition for the product silicon substrate 30 is the depth $d_a$.

According to this, observation of the cross section with a TEM is required only once at the time when the through dose $\Phi_{a/c}$ is identified at step S1, and there is no need to perform observation with a TEM every time the ion implantation for the product silicon substrate 30 is performed. Thus, the cost and labor required for a TEM can be reduced, and at the same time the thickness of the amorphous layer 30a formed in the product silicon substrate 30 can be easily evaluated.

Furthermore, since this method does not use the Monte Carlo method that is difficult to deal with, a designer with ordinary skills can easily calculate the thickness $d_a$ of the amorphous layer 30a.

Note that, although Ge is used as the impurity for forming the amorphous layer 30a in the forgoing description, the impurity is not limited to Ge as long as it does not become a dopant. Impurities that can be used in the present embodiment include Si (silicon) and an inert gas, other than Ge. Even if these impurities are used, the thickness of the amorphous layer can be calculated by the same method as described above.

Furthermore, even when a gallium arsenide substrate or a crystalline substrate other than a semiconductor is used instead of the silicon substrate 30, the thickness of the amorphous layer can be also obtained by the same method as described above.

(vi) Extension to Arsenic Ion Implantation

In the above-described simulating method, Ge is employed as the impurity of ion implantation to intentionally create the amorphous layer 30a. However, the amorphous layer 30a can also be formed by ion implantation of an impurity (e.g., arsenic) for forming a source/drain extension of a MOS transistor. Therefore, the inventor of the present application investigated whether the above-described simulating method is applicable to an amorphous layer formed by arsenic ion implantation.

Figure 27:
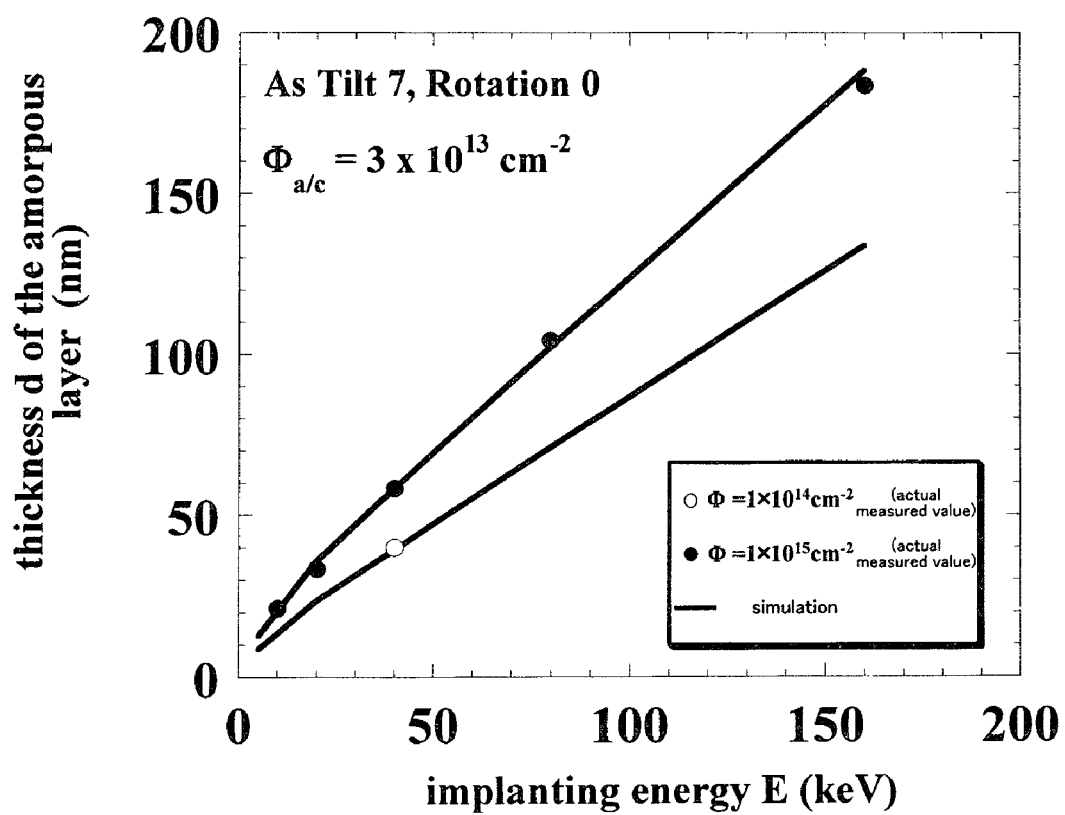
FIG. 27 is a graph obtained by applying the simulation method according to the first embodiment to arsenic ion implantation.

FIG. 27 is a graph obtained by applying the simulating method to the arsenic ion implantation, and the lateral axis shows the implanting energy while the longitudinal axis shows the thickness of the amorphous layer. Note that, in FIG. 27, actually measured depth of the amorphous layer are also plotted for comparison. In addition, a value of the through dose $\Phi_{a/c}$ was set at $3\times10^{13}$ cm$^{-2}$, the tilt angle at the time of ion implantation was set at 7°, and the rotation angle was set at 0°.

As shown in FIG. 27, even when the above-described simulating method is applied to the arsenic ion implantation, the simulation result agrees well with the actually measured depth. Thus, according to this simulating method, it is possible to calculate not only the thickness of the amorphous layer which is intentionally formed, but also the thickness of the amorphous layer which is unintentionally formed by the arsenic ion implantation.

(2) Second Embodiment

In the present embodiment, the simulating method of the ion implantation described in the first embodiment will be applied to a method of manufacturing a MOS transistor.

FIGS. 28A to 28F are cross-sectional views of a semiconductor device according to the present embodiment in the course of manufacturing.

Figure 28A:
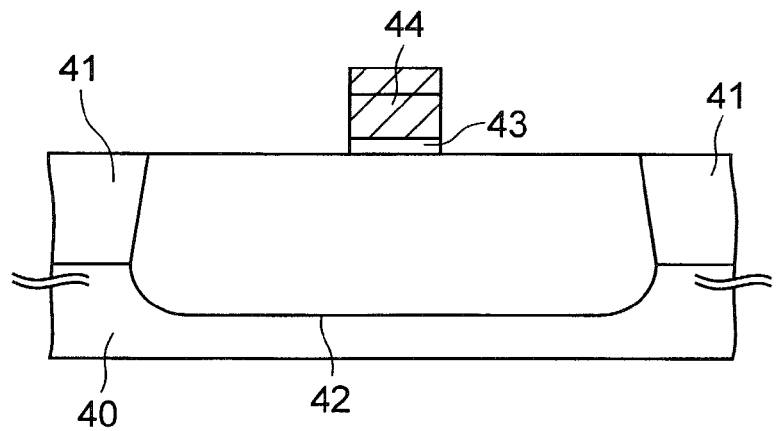
FIGS. 28A to 28F are cross-sectional views showing a manufacturing semiconductor device according to a second embodiment.

Firstly, the description will be given to the processes to obtain the cross-sectional structure shown in FIG. 28A.

First, a groove for STI (Shallow Trench Isolation) for defining an active region of a transistor is formed in a surface of an n-type or p-type silicon (semiconductor) substrate 40. Then, an insulating film, such as silicon oxide, is embedded in the groove to form device isolation insulating films 41. Note that the device isolation structure is not limited to STI, but the device isolation insulating films 41 may be formed by LOCOS (Local Oxidation of Silicon) method.

Next, a p-well 42 is formed by introducing a p-type impurity into the active region of the silicon substrate 40, and thereafter the surface of the active region is thermally oxidized to form a thermal oxidation film that is used as a gate insulating film 43.

Next, an amorphous or crystalline silicon film and a tungsten silicide film are sequentially formed on an entire upper surface of the silicon substrate 40. After that, these films are patterned by the photolithography to form a gate electrode 44.

Figure 28B:
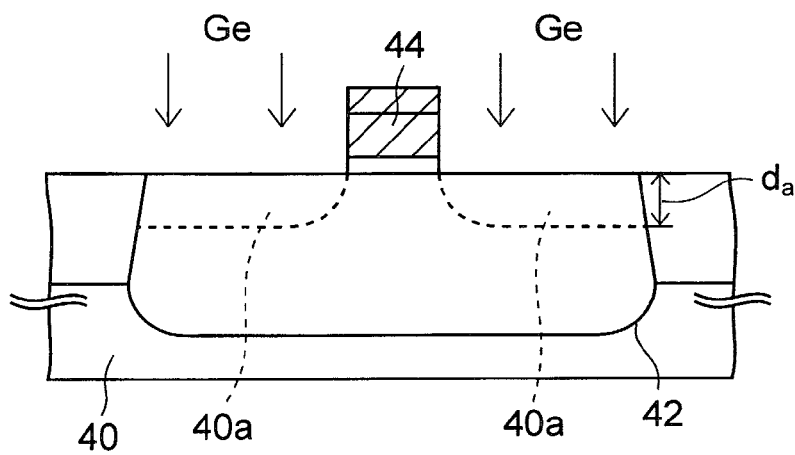

Next, as shown in FIG. 28B, Ge (a first impurity) is ion-implanted into the silicon substrate 40 under a first condition that the implanting energy is 80 keV and the dose amount is $1\times10^{15}$ cm$^{-2}$, so that amorphous layers 40a are formed in the surface layer of the silicon substrate 40. The impurity for forming the amorphous layers 40a is not limited to Ge, but the amorphous layers 40a may be formed by ion-implanting an impurity, such as Si or an inert gas.

Then, according to above-described steps S1 to S4 of FIG. 21, the thickness $d_a$ of the amorphous layers 40a is calculated.

Figure 28C:
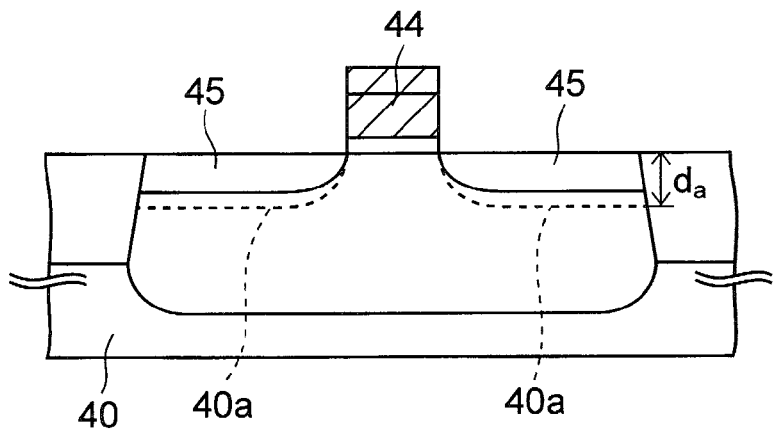

Next, as shown in FIG. 28C, arsenic (a second impurity) is ion-implanted into the silicon substrate 40 on the both sides of the gate electrode 44 under the second condition that the peak depth of the impurity is encompassed in the thickness $d_a$ of the amorphous layers 40a, so that n-type source/drain extensions (impurity diffusion regions) 45 are formed. As the second condition of the above-mentioned ion implantation, for example, the implanting energy of 30 keV and the dose amount of $2\times10^{15}$ cm$^{-2}$ are employed.

Figure 28D:
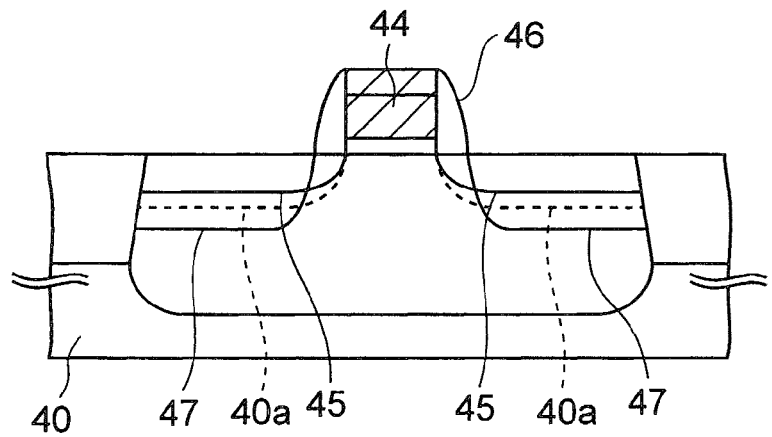

Next, the description will be given of the processes to obtain the cross-sectional structure shown in FIG. 28D.

Firstly, an insulating film is formed on an entire upper surface of the silicon substrate 40, and the formed insulating film is etched back to be left as insulating side walls 46 beside the gate electrode 44. A silicon oxide film is formed by the CVD method as the insulating film, for example.

Next, by using the insulating side wall 46 and the gate electrode 44 as a mask, arsenic is ion-implanted into the silicon substrate 40 again to form n-type source/drain regions 47 in the silicon substrate 40 on the sides of the gate electrode 44.

Figure 28E:
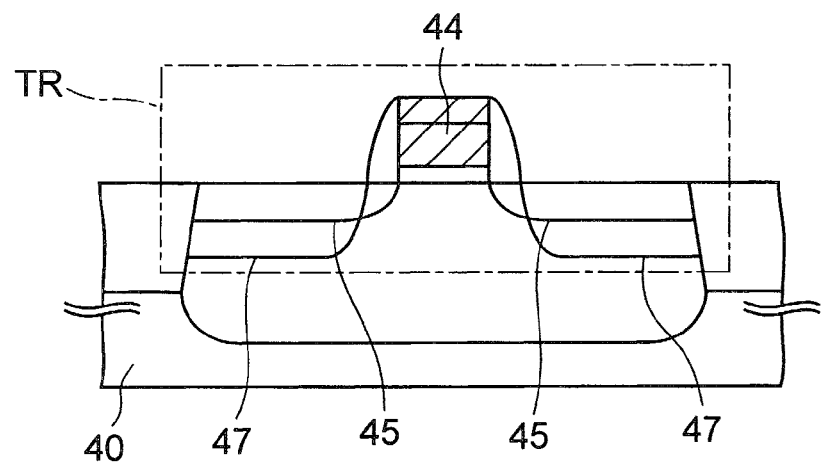

Next, as shown in FIG. 28E, the activation annealing with the substrate temperature of approximately 600° C. to 1100° C. is performed in nitrogen atmosphere on the silicon substrate 40 so as to activate arsenic in each of the n-type source/drain extensions 45 and the n-type source/drain regions 47. In this activation annealing, the amorphous layers 40a formed by ion-implanting Ge is crystallized again and disappears.

With the processes up to here, the MOS transistor TR which is constructed from the gate insulating film 43, the gate electrode 44, the n-type source/drain extensions 45, and the n-type source/drain regions 47 is formed in the active region of the silicon substrate 40.

Figure 28F:
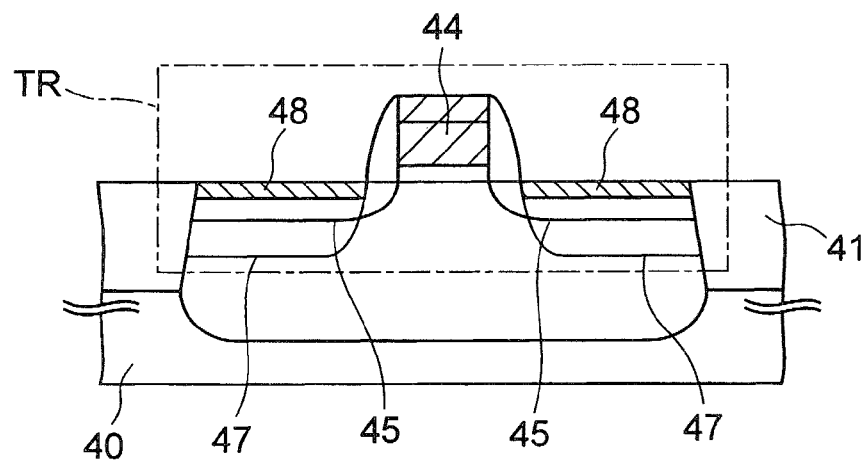

Next, the description will be given of the processes to obtain the cross-sectional structure shown in FIG. 28F.

Firstly, a refractory metal layer, such as a cobalt layer, is formed on the entire upper surface of the silicon substrate 40 by the sputtering method. After that, this refractory metal layer is heated to react with silicon, so that refractory metal silicide layers 48 are formed on the silicon substrate 40. The refractory metal silicide layer 48 is also formed on a surface layer portion of the gate electrode 44, and hence the resistance of the gate electrode 44 is reduced.

After that, unreacted refractory metal layer left on the device isolation insulating film 41 and the like is removed by wet etching.

Thereafter, the process proceeds to the process of forming an interlayer insulating film covering the MOS transistor TR and the process of forming a contact hole in the interlayer insulating film on the source/drain regions 47, but the detailed description thereof will be omitted.

According to the above-described present embodiment, in the process of FIG. 28C, the n-type source/drain extensions 45 are formed so that the peak depth of the impurity is encompassed in the depth $d_a$ of the amorphous layer 40a. Thus, as described in FIGS. 2 and 3, the temperature of the activation annealing on the n-type source/drain extensions 45 can be lowered than the case where the amorphous layer 40a is not formed. In addition, as described by using the experimental results of FIG. 4, the depth of the junction in the n-type source/drain extensions 45 can be made substantially fixed even after the activation annealing. Thus, the impurity diffusion of the n-type source/drain extensions 45 caused by heat can be prevented and miniaturization of the MOS transistor TR can be advanced.

Moreover, since the thickness $d_a$ of the amorphous layer 40a is calculated according to the ion implantation simulation described in the first embodiment, there is no need to measure the thickness $d_a$ from an image of a cross section with a TEM. Thus, the measurement cost of TEM is not shifted to the cost of manufacturing a semiconductor, so that the semiconductor can be manufactured inexpensively.

(3) Third Embodiment

In the above-described second embodiment, as shown in FIG. 28C, the n-type source/drain extensions 45 are formed so as to be encompassed in the amorphous layers 40a, thereby arsenic in the n-type source/drain extensions 45 is prevented from diffusing by heat.

In contrast, in the present embodiment, n-type source/drain extensions 45 are formed without forming the above-described amorphous layers 40a.

FIGS. 29A to 29D are cross-sectional views of a manufacturing semiconductor device according to the present embodiment. Note that in these drawings, reference numerals similar to those of the second embodiment will be given to elements similar to those described in the second embodiment, and the description thereof will be omitted.

Firstly, description will be given to the processes to obtain the cross-sectional structure shown in FIG. 29A.

Figure 29A:
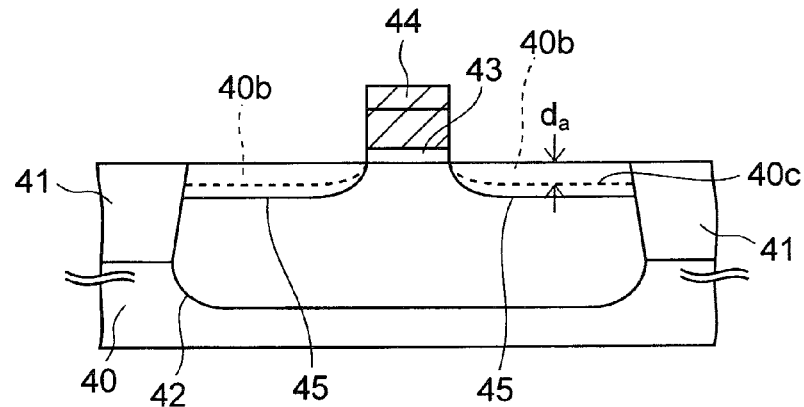
FIGS. 29A to 29D are cross-sectional views showing a manufacturing semiconductor device according to a third embodiment.

First, the process described in FIG. 29A of the second embodiment is performed. Thus, a gate electrode 44 is formed over the silicon substrate 40, in which a p-well 42 is formed, with the gate insulating film 43 being interposed therebetween.

Next, arsenic is ion-implanted into the silicon substrate 40 on both sides of the gate electrode 44 under a condition that, for example, the implanting energy is 30 keV and the dose amount is $2\times10^{15}$ cm$^{-2}$, thereby the n-type source/drain extensions 45 are formed.

By ion-implanting arsenic in this manner, the surface layer of the silicon substrate 40 is caused to be amorphous, so that silicon amorphous layers 40b is formed. In some cases, many defects are formed in an interface 40c between the amorphous layer 40b and silicon which is not made to be amorphous. Since the defects greatly affect the characteristics of the MOS transistor, it is required to grasp the positions of the defects by obtaining the thickness $d_a$ of the amorphous layer 40b.

To meet this requirement, after the n-type source/drain extensions 45 are formed as described above, the thickness $d_a$ of the amorphous layer 40a is calculated in accordance with steps S1 to S4 of FIG. 21 described in the first embodiment.

Figure 29B:
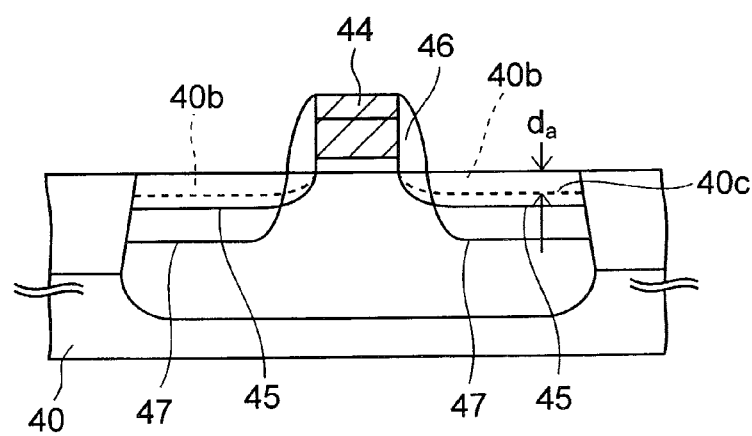

Next, as shown in FIG. 29B, an insulating film, such as a silicon oxide film, is formed on an entire upper surface of the silicon substrate 40, and the formed insulating film is etched back to be left as insulating side walls 46 beside the gate electrode 44.

After that, by using the insulating side wall 46 and the gate electrode 44 as a mask, arsenic is ion-implanted into the silicon substrate 40 again, so that n-type source/drain regions 47 are formed in the silicon substrate 40 on the sides of the gate electrode 44.

Figure 29C:
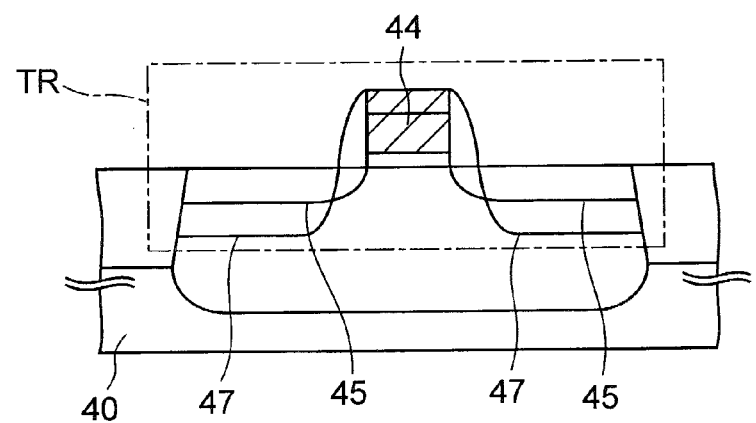

Next, as shown in FIG. 29C, the activation annealing with the substrate temperature of approximately 600° C. to 1100° C. is performed in nitrogen atmosphere on the silicon substrate 40 so as to activate arsenic in each of the n-type source/drain extensions 45 and the n-type source/drain regions 47. With this activation annealing, the amorphous layers 40b are caused to be crystallized again.

With the processes above, the basic structure of the MOS transistor TR has been completed.

Figure 29D:
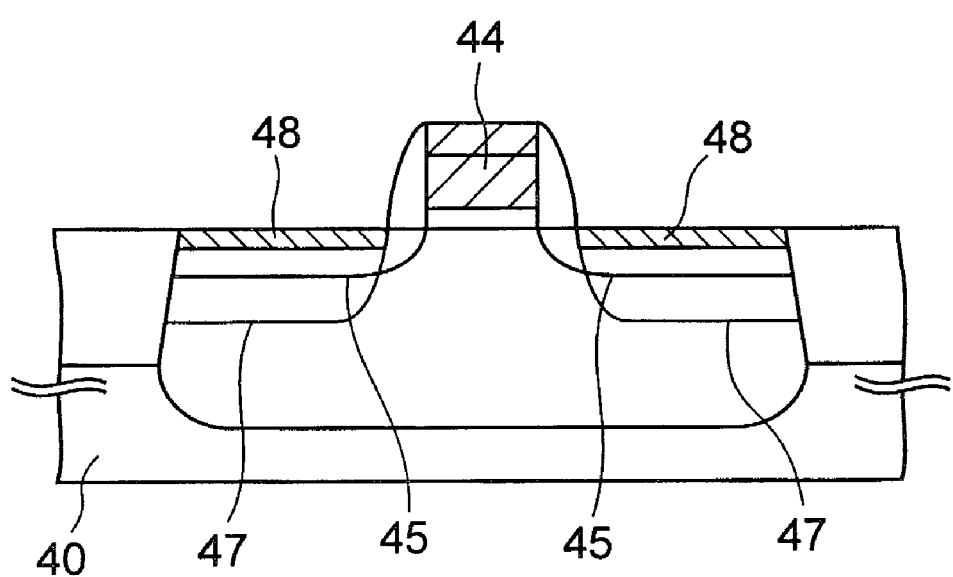

In the following, as shown in FIG. 29D, similar to the second embodiment, refractory metal silicide layers 48 are formed in the n-type source/drain regions 47.

According to the present embodiment described above, the thickness $d_a$ of the amorphous layers 40b, which is formed when the n-type source/drain extensions 45 are formed, is calculated in accordance with the ion implantation simulation described in the first embodiment. In the ion implantation simulation, the thickness $d_a$ of the amorphous layers 40b is not measured with a TEM, and thus the cost of manufacturing a semiconductor device can be reduced by the measurement cost of the TEM. Furthermore, by obtaining the thickness $d_a$ of the amorphous layers 40b in this manner, the positions of the defects, which are easily generated in the interface between the amorphous layer 40b and the crystallized layer which is not caused to be amorphous, can be grasped, and hence the electric characteristics of the MOS transistor TR can be estimated.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A simulator of ion implantation, comprising:
   a database to store a form parameter of an impurity concentration distribution so as to correspond to a condition of ion implantation; and
   a control unit operably coupled to the database and configured to execute:
   calculating an integral value $\phi_a/c$ by integrating an impurity concentration distribution from a thickness $d_0$ of an amorphous layer to infinite, where the impurity being ion-implanted into a test crystalline substrate under a test condition, and the amorphous layer is formed in the test crystalline substrate by the ion-implantation;
   acquiring the form parameter of an impurity concentration distribution in a product crystalline substrate that is to be obtained by ion-implanting the impurity under a product condition, by referring to the database;
   creating a distribution function that approximates the impurity concentration distribution by using the acquired form parameter; and
   obtaining such a depth $d_a$ that an integral value obtained by integrating the distribution function from the depth $d_a$ to infinite is equal to the integral value $\phi_{a/c}$, and specifying that a thickness of the amorphous layer to be formed in the product crystalline substrate by ion-implanting the impurity under the product condition is the depth $d_a$.

2. The simulator according to claim 1, wherein the form parameter includes an ion range $R_p$ of the impurity concentration and a standard deviation $\Delta R_p$ of the impurity concentration in a depth direction.

3. The simulator according to claim 2, wherein the distribution function includes a Gaussian distribution function.

4. The simulator according to claim 2, wherein the form parameter further includes skewness γ and kurtosis β, and the distribution function includes a Pearson IV distribution function.

5. The simulator according to claim 1, wherein the product conditions and the test conditions includes an implanting energy and a dose amount.

6. The simulator according to claim 1, wherein the impurity concentration distribution at the step of calculating the integral value $\phi_{a/c}$ is obtained on the basis of a distribution function which is created by a form parameter of concentration distribution corresponding to the test condition, the form parameter being acquired by referring to the database.

7. The simulator according to claim 1, wherein the impurity is any one of silicon, germanium, and an inert gas.

8. The simulator according to claim 1, wherein the impurity is arsenic.

9. The simulator according to claim 1, wherein the crystalline substrate is a semiconductor substrate.

10. The simulator according to claim 9, wherein the semiconductor substrate is a silicon substrate or a gallium arsenide substrate.

11. The simulator according to claim 1, wherein the control unit is a computer.

12. A method for manufacturing a semiconductor device, comprising:
    forming a gate electrode over a semiconductor substrate with a gate insulating film therebetween;
    forming an amorphous layer in a surface layer of the semiconductor substrate by ion-implanting a first impurity into the semiconductor substrate on both sides of the gate electrode under a first condition;
    forming an impurity diffusion region by ion-implanting a second impurity into the semiconductor substrate on both sides of the gate electrode under a second condition that a peak depth of the impurity is within the thickness of the amorphous layer; and
    activating the second impurity by heating the semiconductor substrate,
    wherein, ion-implanting the first impurity further comprising:
    calculating an integral value $\phi_{a/c}$ by integrating a concentration distribution of the first impurity from a thickness $d_0$ of an amorphous layer to infinite, where the amorphous layer being formed in a test crystalline substrate by ion-implanting the first impurity into the test crystalline substrate under a test condition;
    acquiring a form parameter of a concentration distribution of the first impurity that is to be obtained by the first condition, by referring to a database in which the form parameter of the concentration distribution of the first impurity is stored so as to correspond to a condition of ion implantation;
    creating a distribution function that approximates the concentration distribution of the first impurity by using the acquired form parameter, and
    obtaining such a depth $d_a$ that an integral value obtained by integrating the distribution function from the depth $d_a$ to infinite is equal to the integral value $\phi_{a/c}$, and specifying that a thickness of the amorphous layer formed in the semiconductor substrate is the depth $d_a$.

13. The method for manufacturing a semiconductor device according to claim 12, wherein the first impurity is any one of silicon, germanium, and an inert gas, and the second impurity is arsenic.

14. The method for manufacturing a semiconductor device according to claim 12, wherein the impurity diffusion region is a source/drain extension of a MOS transistor.

15. A method for manufacturing a semiconductor device, comprising:

forming a gate electrode over a semiconductor substrate with a gate insulating film interposed therebetween;

forming an impurity diffusion region by ion-implanting an impurity into the semiconductor substrate on both sides of the gate electrode; and activating the impurity by heating the semiconductor substrate, wherein, ion-implanting the impurity further comprising:

calculating an integral value $\phi_{a/c}$ by integrating a concentration distribution of the impurity from a thickness $d_0$ of an amorphous layer to infinite, where the amorphous layer being formed in a test crystalline substrate by ion-implanting the impurity into the test crystalline substrate under a test condition;

acquiring a form parameter of an impurity concentration distribution that is to be obtained by a condition of the ion-implantation of forming the impurity diffusion region, by referring to a database in which the form parameter of the impurity concentration distribution is stored so as to correspond to a condition of ion implantation;

creating a distribution function that approximates the impurity concentration distribution by using the acquired form parameter, and obtaining such a depth $d_a$ that an integral value obtained by integrating the distribution function from the depth $d_a$ to infinite is equal to the integral value $\phi_{a/c}$, and specifying that a thickness of an amorphous layer formed in the semiconductor substrate at the time of forming the impurity diffusion region is the depth $d_a$.

16. The method for manufacturing a semiconductor device according to claim 15, wherein the impurity is arsenic.

17. The method for manufacturing a semiconductor device according to claim 15, wherein the impurity diffusion region is a source/drain extension of a MOS transistor.

* * * * *